(12) United States Patent
Seo

(10) Patent No.: US 11,537,379 B2
(45) Date of Patent: Dec. 27, 2022

(54) CONTEXT BASED APPLICATION PROVIDING SERVER AND CONTROL METHOD THEREOF

(71) Applicant: Samsung Electronics Co., Ltd., Suwon-si (KR)

(72) Inventor: Hyungjin Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/092,072

(22) Filed: Nov. 6, 2020

(65) Prior Publication Data

US 2021/0141624 A1 May 13, 2021

(30) Foreign Application Priority Data

Nov. 7, 2019 (KR) .................. 10-2019-0141763

(51) Int. Cl.
*G06F 3/0481* (2022.01)
*G06F 8/61* (2018.01)

(52) U.S. Cl.
CPC .............. *G06F 8/61* (2013.01); *G06F 3/0481* (2013.01)

(58) Field of Classification Search
CPC ......... G06F 8/61; G06F 3/0481; G06F 9/4451
See application file for complete search history.

(56) References Cited

U.S. PATENT DOCUMENTS

| | | |
|---|---|---|
| 5,634,092 A | 5/1997 | Stokes |
| 6,618,750 B1 | 9/2003 | Staats |
| 7,461,088 B2 | 12/2008 | Thorman et al. |
| 7,580,568 B1 | 8/2009 | Wang et al. |
| 7,710,397 B2 | 5/2010 | Krah et al. |
| 7,809,785 B2 | 10/2010 | Appleton et al. |

(Continued)

FOREIGN PATENT DOCUMENTS

| | | |
|---|---|---|
| JP | 2007213152 A | 8/2007 |
| JP | 2011158186 A | 8/2011 |

(Continued)

OTHER PUBLICATIONS

International Search Report and Written Opinion of the International Searching Authority dated Feb. 10, 2021 in connection with International Application No. PCT/KR2020/015423, 8 pages.

*Primary Examiner* — Phenuel S Salomon

(57) ABSTRACT

A server includes a communicator, a memory, and a processor. The communicator is configured to connect to a plurality of electronic apparatuses. The memory is configured to store information on a plurality of applications for each user context. The processor is configured to, based on an installation information of a first application from among a plurality of applications being received from a first electronic apparatus from among the plurality of electronic apparatuses, identify a context corresponding to the first application, based on the information on the plurality of applications, identify a second application corresponding to the context from among the plurality of applications, and control the communicator to transmit an installation command of the second application, to a second electronic apparatus capable of installing the second application from among the plurality of electronic apparatuses.

19 Claims, 18 Drawing Sheets

(56) References Cited

U.S. PATENT DOCUMENTS

| | | |
|---|---|---|
| RE42,064 E | 1/2011 | Fish |
| 7,970,240 B1 | 6/2011 | Chao et al. |
| 8,004,529 B2 | 8/2011 | Wood et al. |
| 8,140,321 B1 | 3/2012 | Brants et al. |
| 8,212,821 B1 | 7/2012 | Kopylov et al. |
| 8,219,638 B2 | 7/2012 | Weinberg et al. |
| 8,244,743 B2 | 8/2012 | Gonzalez et al. |
| 8,381,189 B2 | 2/2013 | Surazski et al. |
| 8,384,686 B1 | 2/2013 | Sears |
| 8,438,079 B1 | 5/2013 | Nguyen et al. |
| 8,462,123 B1 | 6/2013 | Sears |
| 8,521,948 B2 | 8/2013 | Post et al. |
| 8,566,175 B1 | 10/2013 | Nguyen et al. |
| 8,589,425 B2 | 11/2013 | Gonzalez et al. |
| 8,595,059 B1 | 11/2013 | Huang |
| 8,595,414 B2 | 11/2013 | Post et al. |
| 8,606,834 B2 | 12/2013 | Thomas |
| 8,621,450 B2 | 12/2013 | Firman et al. |
| 8,645,327 B2 | 2/2014 | Falkenburg et al. |
| 8,681,203 B1 | 3/2014 | Yin et al. |
| 8,707,289 B2 | 4/2014 | Firman et al. |
| 8,717,368 B1 | 5/2014 | Kopylov et al. |
| 8,762,446 B1 | 6/2014 | Staats |
| 8,767,126 B2 | 7/2014 | Brown et al. |
| 8,781,449 B2 | 7/2014 | Myllynen et al. |
| 8,832,817 B2 | 9/2014 | Cohen |
| 8,855,904 B1 | 10/2014 | Templeton et al. |
| 8,898,637 B2 | 11/2014 | Surazski et al. |
| 8,966,655 B2 | 2/2015 | Womack et al. |
| 9,002,109 B2 | 4/2015 | Krishnaswamy et al. |
| 9,002,930 B1 | 4/2015 | Want et al. |
| 9,020,485 B2 | 4/2015 | Toy et al. |
| 9,047,348 B2 | 6/2015 | Dayan |
| 9,047,870 B2 | 6/2015 | Ballinger et al. |
| 9,098,380 B2 | 8/2015 | Firman et al. |
| 9,098,530 B2 | 8/2015 | Gonzalez et al. |
| 9,124,664 B1 | 9/2015 | Ravindranath |
| 9,158,521 B2 | 10/2015 | Cohen et al. |
| 9,191,832 B2 | 11/2015 | Marti et al. |
| 9,203,624 B2 | 12/2015 | Kelly et al. |
| 9,210,138 B2 | 12/2015 | Nakhjiri et al. |
| 9,244,673 B2 | 1/2016 | Chinn et al. |
| 9,262,057 B2 | 2/2016 | Brown et al. |
| 9,280,177 B2 | 3/2016 | Degner et al. |
| 9,286,050 B2 | 3/2016 | Moore et al. |
| 9,303,996 B2 | 4/2016 | Huang |
| 9,323,598 B2 | 4/2016 | Surazski et al. |
| 9,336,358 B2 | 5/2016 | Ramachandran et al. |
| 9,342,323 B2 | 5/2016 | Glazkov |
| 9,392,051 B2 | 7/2016 | Cabillic et al. |
| 9,396,458 B2 | 7/2016 | Weinberg et al. |
| 9,417,860 B2 | 8/2016 | Cohen et al. |
| 9,418,341 B1 | 8/2016 | Kadarkarai |
| 9,424,799 B2 | 8/2016 | Bhatt |
| 9,445,528 B2 | 9/2016 | Cohen et al. |
| 9,454,726 B1 | 9/2016 | Yao et al. |
| 9,460,449 B2 | 10/2016 | Juda et al. |
| 9,482,296 B2 | 11/2016 | Lemay et al. |
| 9,485,230 B2 | 11/2016 | Nakhjiri et al. |
| 9,525,771 B2 | 12/2016 | Marti et al. |
| 9,594,605 B2 | 3/2017 | Farrugia et al. |
| 9,595,027 B2 | 3/2017 | Firman et al. |
| 9,632,566 B2 | 4/2017 | Culbert |
| 9,635,570 B2 | 4/2017 | Ronen et al. |
| 9,710,252 B2 | 7/2017 | Kelly et al. |
| 9,710,621 B1 | 7/2017 | Thirthala et al. |
| 9,729,380 B1 | 8/2017 | Chung |
| 9,749,438 B1 | 8/2017 | Wen et al. |
| 9,749,803 B1 | 8/2017 | Huang |
| 9,785,424 B2 | 10/2017 | Firlik et al. |
| 9,794,540 B2 | 10/2017 | Barron et al. |
| 9,807,621 B1 | 10/2017 | Hui et al. |
| 9,836,831 B1 | 12/2017 | Krishnaswamy et al. |
| 9,882,818 B2 | 1/2018 | Shao et al. |
| 9,894,196 B2 | 2/2018 | Marti et al. |
| 9,992,054 B1 | 6/2018 | Chung |
| 10,007,512 B2 | 6/2018 | Surazski et al. |
| 10,007,960 B2 | 6/2018 | Womack et al. |
| 10,021,202 B1 | 7/2018 | Deshpande et al. |
| 10,031,919 B2 | 7/2018 | Falkenburg et al. |
| 10,042,652 B2 | 8/2018 | Jacoby et al. |
| 10,067,628 B2 | 9/2018 | Kuscher et al. |
| 10,091,479 B2 | 10/2018 | Barron et al. |
| 10,218,835 B2 | 2/2019 | Marti et al. |
| 10,289,732 B2 | 5/2019 | Marchiori et al. |
| 10,290,035 B2 | 5/2019 | Firman et al. |
| 10,768,796 B2 | 9/2020 | Kim et al. |
| 2002/0107875 A1* | 8/2002 | Seliger ............... G06F 21/6272 |
| 2006/0253592 A1 | 11/2006 | Oashi et al. |
| 2009/0235243 A1 | 9/2009 | Jung et al. |
| 2010/0262959 A1* | 10/2010 | Bruno ............... G06F 21/6209 |
| | | 717/171 |
| 2011/0264656 A1* | 10/2011 | Dumais ............... G06F 16/9537 |
| | | 707/728 |
| 2012/0042036 A1* | 2/2012 | Lau ............... H04W 4/029 |
| | | 709/217 |
| 2012/0209839 A1* | 8/2012 | Andrews ............... H04L 67/306 |
| | | 707/728 |
| 2013/0013419 A1* | 1/2013 | Sim ............... G06Q 30/0241 |
| | | 705/14.69 |
| 2013/0061218 A1* | 3/2013 | Moore ............... G06F 8/62 |
| | | 717/177 |
| 2013/0110943 A1 | 5/2013 | Menon et al. |
| 2013/0252597 A1 | 9/2013 | Jin et al. |
| 2014/0006616 A1* | 1/2014 | Aad ............... G06F 21/552 |
| | | 709/225 |
| 2014/0025521 A1 | 1/2014 | Alsina et al. |
| 2014/0089913 A1* | 3/2014 | Aaronson ............... G06F 8/62 |
| | | 717/174 |
| 2015/0113404 A1 | 4/2015 | Agnoli et al. |
| 2015/0280933 A1* | 10/2015 | Choi ............... H04M 3/548 |
| | | 709/217 |
| 2016/0048320 A1* | 2/2016 | Han ............... G06F 3/0481 |
| | | 715/765 |
| 2016/0085763 A1* | 3/2016 | Tatourian ............... G06F 8/62 |
| | | 707/662 |
| 2016/0239578 A1* | 8/2016 | Evans ............... H04W 4/00 |
| 2016/0253296 A1 | 9/2016 | Glazkov |
| 2016/0328731 A1 | 11/2016 | Kadarkarai |
| 2017/0039170 A1 | 2/2017 | Tunali et al. |
| 2017/0046741 A1 | 2/2017 | Hunter |
| 2017/0242675 A1 | 8/2017 | Deshmukh |
| 2017/0279269 A1 | 9/2017 | Neagu et al. |
| 2017/0315792 A1* | 11/2017 | Evans ............... G06Q 10/00 |
| 2017/0339653 A1 | 11/2017 | Hui et al. |
| 2017/0371642 A1 | 12/2017 | Kelly et al. |
| 2018/0024829 A1 | 1/2018 | Sung et al. |
| 2018/0035305 A1 | 2/2018 | Hui et al. |
| 2018/0046940 A1 | 2/2018 | Hummel et al. |
| 2018/0052851 A1 | 2/2018 | Lewis et al. |
| 2018/0262793 A1 | 9/2018 | Lau et al. |
| 2018/0314510 A1 | 11/2018 | Roy-Chowdhury et al. |
| 2018/0337967 A1 | 11/2018 | Ritchie et al. |
| 2019/0098785 A1 | 3/2019 | Mintz et al. |
| 2019/0188013 A1 | 6/2019 | Krishna et al. |
| 2019/0324628 A1 | 10/2019 | Kim et al. |
| 2021/0141624 A1* | 5/2021 | Seo ............... G06F 3/0481 |

FOREIGN PATENT DOCUMENTS

| | | |
|---|---|---|
| JP | 2018174000 A | 11/2018 |
| KR | 10-2013-0006304 A | 1/2013 |
| KR | 10-1659574 B1 | 10/2016 |

\* cited by examiner

CONTEXT BASED APPLICATION PROVIDING SERVER AND CONTROL METHOD THEREOF

CROSS-REFERENCE TO RELATED APPLICATION

This application is based on and claims priority under 35 U.S.C. § 119 to Korean Patent Application No. 10-2019-0141763, filed on Nov. 7, 2019, in the Korean Intellectual Property Office, the disclosure of which is incorporated by reference herein in its entirety.

BACKGROUND

1. Field

The disclosure relates to a server providing an application to a plurality of electronic devices. More particularly, the disclosure relates to a server that provides applications necessary to users based on user context to a plurality of electronic devices.

2. Description of Related Art

In most case, applications produced/distributed services to a user through one device. Accordingly, there was the limitation of not being able to take into consideration a plurality of devices of a specific user operating in association with one another.

Particularly, the user had to input user operation for installing an application on each of the plurality of devices in order to operate the plurality of devices in association with one another.

SUMMARY

According to an embodiment, a server includes a communicator connected to a plurality of electronic apparatuses, a memory storing information on a plurality of applications for each context, and a processor configured to, based on an installation information of a first application from among a plurality of applications being received from a first electronic apparatus from among the plurality of electronic apparatuses, identify a context corresponding to the first application, based on the information on the plurality of applications, identify a second application corresponding to the context from among the plurality of applications, and control the communicator to transmit an installation command of the second application, to a second electronic apparatus capable of installing the second application from among the plurality of electronic apparatuses.

According to an embodiment, a control method of a server stored with information on a plurality of applications for each context includes, based on an installation information of a first application from among a plurality of applications being received from a first electronic apparatus from among a plurality of electronic apparatuses, identifying a context corresponding to the first application, based on the information on the plurality of applications, identifying a second application corresponding to the context from among the plurality of applications, and transmitting an installation command of the second application, to a second electronic apparatus capable of installing the second application from among the plurality of electronic apparatuses.

According to an embodiment, a system includes a server configured to store information on a plurality of applications for each context, and the server is configured to, based on an installation information of a first application from among a plurality of applications being received from a first electronic apparatus from among the plurality of electronic apparatuses, identify a context corresponding to the first application, based on the information on the plurality of applications, identify a second application corresponding to the context from among the plurality of applications, and transmit an installation command of the second application, to a second electronic apparatus capable of installing the second application from among the plurality of electronic apparatuses.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
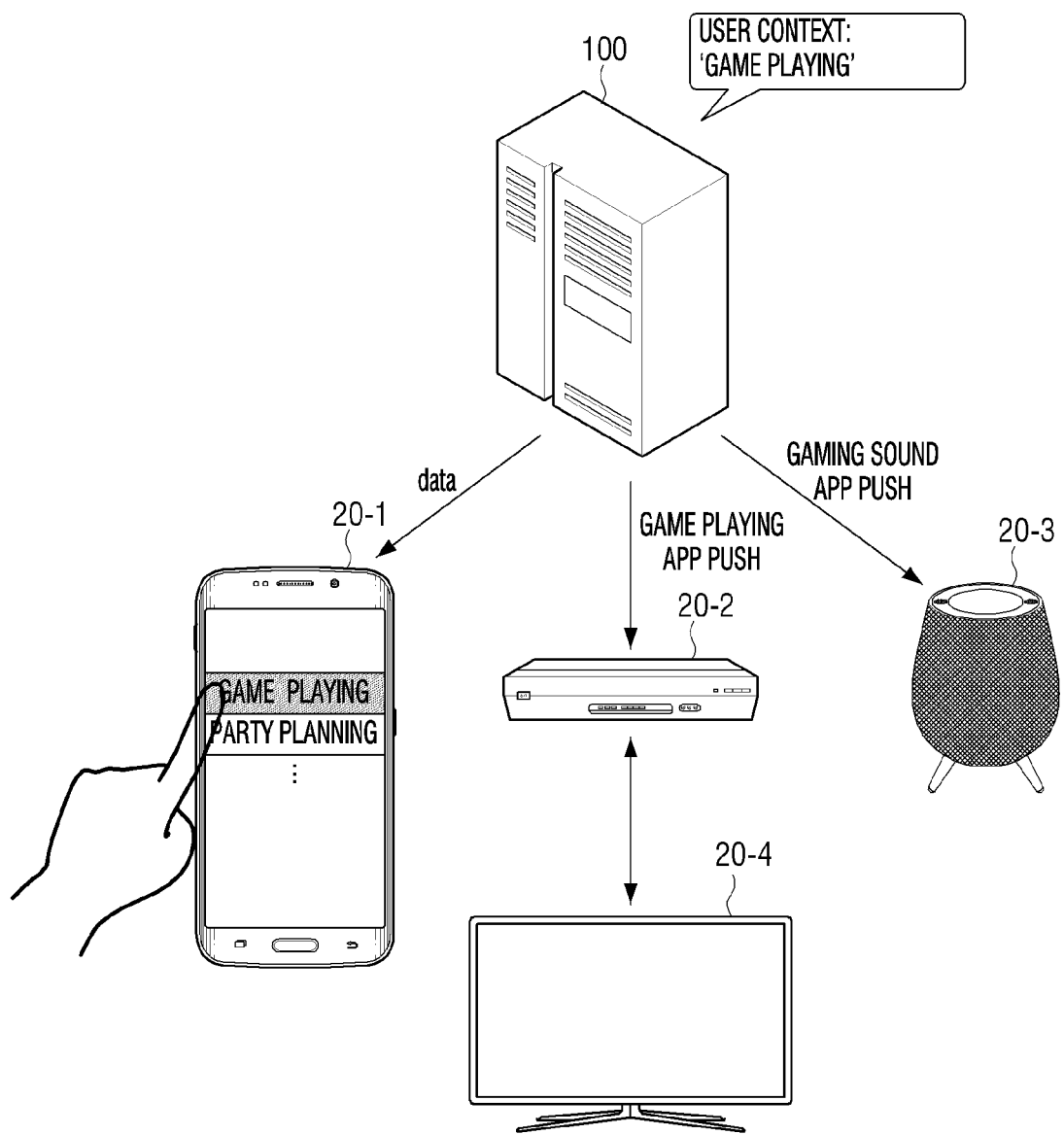
FIG. 1 illustrates a diagram of an operation of a server controlling an application installation of a plurality of electronic apparatuses according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The disclosure provides a server configured to identify a user context with only a user input on any one from among a plurality of electronic apparatuses, and control for one or more applications to be installed in a plurality of electronic apparatuses without a separate user command based on the identified context.

The disclosure provides a server configured to form a separate network for each group by dividing the plurality of electronic apparatuses into a plurality of groups according to user information or location information, and separately manage a context of the user and an application installation for each formed network.

The disclosure provides a server or system configured to edit/generate information on an application/a function corresponding to a context based on a user command, and freely enable the selling/purchasing of services which include the edited/generated application/function between users.

Before describing the disclosure, description methods of the present disclosure and drawings will be described.

The terms used in the disclosure are general terms identified in consideration of the functions of the various example embodiments of the disclosure. However, these terms may vary depending on intention, legal or technical interpretation, emergence of new technologies, and the like of those skilled in the related field of art. Also, there may be some arbitrary terms. Unless there is a specific definition of a term, the term may be construed based on the overall contents and technological common sense of those skilled in the related art.

Further, like reference numerals or symbols indicate like components or elements that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings may not refer to only one embodiment.

The terms including ordinal numbers such as "first," "second," and the like may be used to differentiate between elements in the disclosure. The ordinal numbers are used to distinguish same or similar elements from another, and should not be understood as limiting the meaning of the terms as a result of using these ordinal numbers. For example, the elements associated with the ordinal numbers should not be limited in the order of use, order of arrangement, or the like by the numbers.

A singular expression in the disclosure includes a plural expression, unless otherwise specified clearly in context. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the embodiments of the disclosure, terms such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be implemented in an individual hardware, the components may be integrated in at least one module or chip and be implemented in at least one processor.

In addition, in the various example embodiments described herein, when any part is indicated as following another part, this includes not only a direct connection, but also an indirect connection through another medium. Further, when a certain part includes a certain element, unless specified to the contrary, another element may be additionally included, rather than precluding another element.

In the disclosure, the term "application" may be designated as an 'application' or an 'App.'

FIG. 1 illustrates a diagram of an operation of a server controlling an application installation of a plurality of electronic apparatuses according to an embodiment of the disclosure.

Referring to FIG. 1, the server 100 may perform communication with a plurality of electronic apparatuses 20-1, 20-2 and 20-3. In FIG. 1, the electronic apparatus 20-1 may be a smartphone, the electronic apparatus 20-2 may be a gaming device connected with a television (TV) 20-4, and the electronic apparatus 20-3 may be a speaker.

Referring to FIG. 1, a user command of selecting 'game playing' may be input to the electronic apparatus 20-1 which is a smartphone in the form of touch, or the like. The server 100 which received data/information on a user command from the electronic apparatus 20-1 may identify a user context of the plurality of electronic apparatuses 20-1, 20-2 and 20-3 as 'game playing,' and perform a push on each of the each of the electronic apparatus 20-2 and the speaker 20-3 to cause the 'game playing' application and 'gaming sound' application pre-set with respect to the context 'game playing' to be installed in each of the electronic apparatus 20-2 and the speaker 20-3.

Accordingly, the server 100 may provide a game playing environment appropriate to a user context through a plurality of electronic apparatuses 20-1, 20-2 and 20-3 even when there is no user command input to each of an electronic apparatus 20-2 and a speaker 20-3.

Figure 2A:
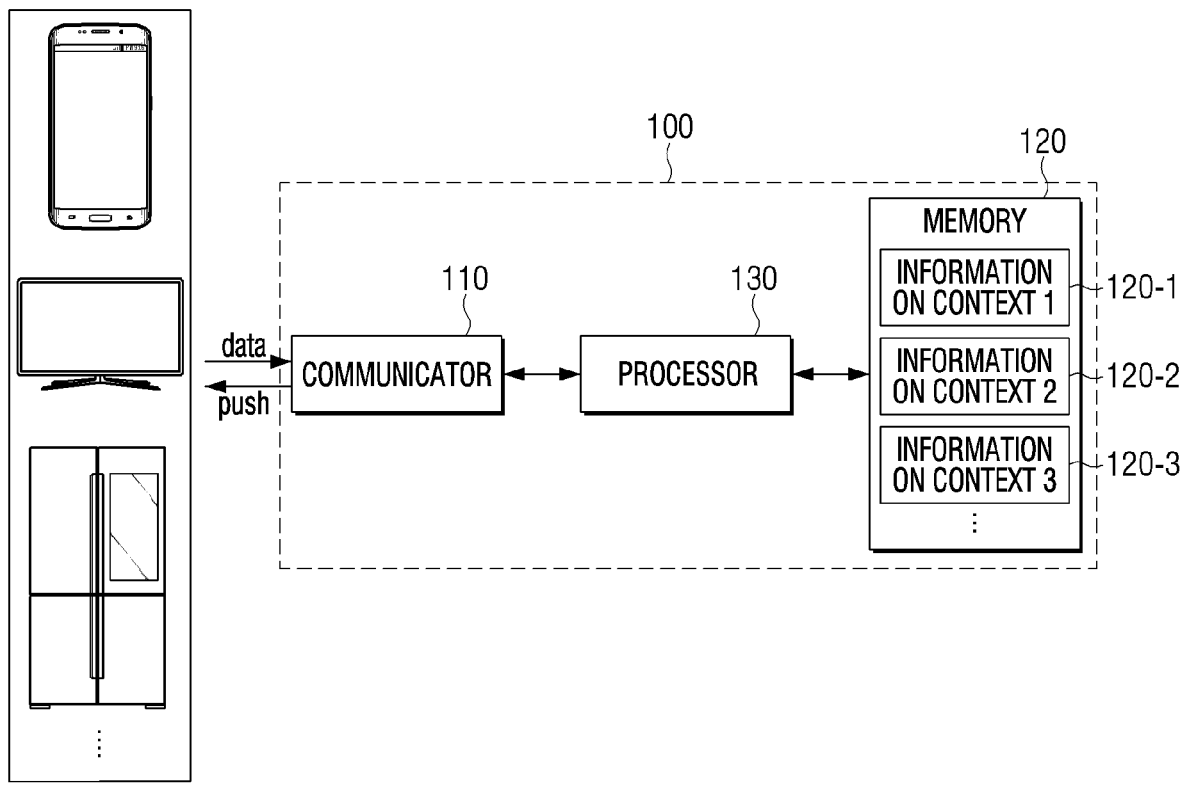
FIG. 2A illustrates a block diagram of a configuration of a server according to an embodiment of the disclosure.

FIG. 2A illustrates a block diagram of a configuration of a server according to an embodiment of the disclosure.

Referring to FIG. 2A, the server 100 may include a communicator 110, a memory 120, and a processor 130. The server 100 may be implemented as one or more electronic apparatuses.

The communicator 110 may be a configuration for transmitting and receiving a signal/data by performing, by the server 100, communication with at least one external electronic apparatus. To this end, the communicator 110 may comprise circuitry.

The communicator 110 may transmit and receive various information with at least one external electronic apparatus by using communication protocols such as, for example, and without limitation, transmission control protocol/internet protocol (TCP/IP), user datagram protocol (UDP), hyper text transfer protocol (HTTP), secure hyper text transfer protocol (HTTPS), file transfer protocol (FTP), secure file transfer protocol (SFTP), message queuing telemetry transport (MQTT), or the like.

The communicator 110 may connect with the external electronic apparatus based on a network realized through wired communication and/or wireless communication. The communicator 110 may be directly connected with the external electronic apparatus, but also connected with the external electronic apparatus through one or more external servers (e.g., internet service provider (ISP)) which provide a network.

The network may be a personal area network (PAN), a local area network (LAN), a wide area network (WAN), or the like according to an area or scale, and an intranet, an extranet, an internet, or the like based on the openness of the network.

The wireless communication herein may include at least one from among communication methods such as, for example, and without limitation long-term evolution (LTE), LTE Advance (LTE-A), 5th generation (5G) mobile communication, code division multiple access (CDMA), wideband CDMA (WCDMA), universal mobile telecommunications system (UMTS), wireless broadband (WiBro), global system for mobile communications (GSM), time division multiple access (DMA), WiFi (Wi-Fi), WiFi Direct, Bluetooth, near field communication (NFC), ZigBee, or the like. The wired communication herein may include at least one from among communication methods such as, for example, and without limitation, Ethernet, optical network, universal serial bus (USB), ThunderBolt, or the like. The communicator 110 may include a network interface or a network chip according to the above-described wired or wireless communication method. The communication method is not limited to the above-described examples, and may include a newly appearing communication method according to development of technologies.

The memory 120 may be a configuration for storing an operating system (OS) for controlling the overall operation of elements of the server 100 and at least one instruction or data related to an element of the server 100.

The processor 130 may perform an operation according to the various embodiments which will be described below by executing at least one instruction stored in the memory 120

The memory 120 may include non-volatile memory such as a read only memory (ROM) and a flash memory, and a volatile memory comprised of a DRAM, and the like. In addition, the memory 120 may also include a storage comprised of a hard disk, a solid state drive (SSD), and the like.

The memory 120 may store information on user context for each context. Referring to FIG. 2A, the memory 120 may store information on various context 120-1, 120-2, 120-3, . . . . Each of the contexts 120-1, 120-2, 120-3, . . . may refer to a situation of a user. More specifically, it may refer to a user situation which at least one user may face from among a plurality of electronic apparatuses connected with the communicator 110. The user context may correspond to various user situations such as, for example, and without limitation, 'game playing,' 'cookie baking,' 'party planning,' 'exercise,' 'relaxation,' or the like.

The memory 120 may store information on a plurality of applications corresponding to each user context and information on a plurality of functions corresponding to each user context. The information on the plurality of functions corresponding to each user context may be information on a function of each of the plurality of applications corresponding to each user context.

Through FIG. 2B below, information on user context stored in the memory 120 including specifically what type of information will be described using information on context 1 120-1 as an example. Information on context 2 120-2, information on context 3 120-3, or the like may be configured similarly as with information on context 1 to be described below.

Figure 2B:
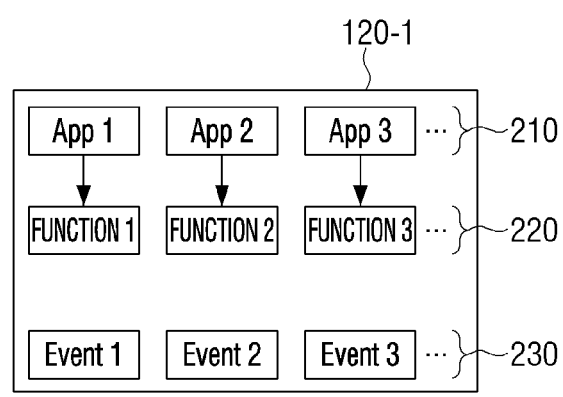
FIG. 2B illustrates a block diagram of information stored in a memory of a server according to an embodiment of the disclosure.

Referring to FIG. 2B, information on context 1 120-1 may include information a plurality of applications 210 corresponding to context 1. The application may relate to an application program capable of being installed and executed in at least one from among the plurality of electronic apparatuses connected with the communicator 110.

The information on the plurality of applications 210 corresponding to context 1 may, based on the user context of the electronic apparatuses connected to the communicator 110 being context 1, include information on which application is to be installed by the at least one from among the electronic apparatuses. The information on the plurality of applications 210 may include information on a provider (e.g., IP address of external server) of each of the plurality of applications, a website address capable of downloading each of the plurality of applications, information on a name or the like of each of the plurality of applications.

In addition, information on the plurality of applications 210 may include information on the electronic apparatus in which each of the plurality of applications may be installed, such as, for example, information on a type, size, operating environment, name of product, and the like of the electronic apparatus.

Referring to FIG. 2B, the information on context 1 120-1 may include information on a plurality of functions 220 corresponding to context 1.

The information on the plurality of functions 220 corresponding to context 1 may, based on the user context of the electronic apparatuses connected to the communicator 110 being context 1, include information on functions to be performed through the plurality of applications corresponding to context 1. The information on the functions to be performed may include not only information on what the corresponding function is, but also information on a condition (e.g., time, state of the electronic apparatus which will perform corresponding function, state of other electronic apparatuses, etc.) for the corresponding function to be performed.

Referring to FIG. 2B, the information on context 1 120-1 may include information on the plurality of events 230 corresponding to context 1.

The information on context 1 120-1 may include information on a start event which causes the user context to be identified as context 1, information on an end event which causes the user context to no longer be identified as context 1, and the like.

For example, various events such as, an event in which a specific application from among the plurality of applications corresponding to context 1 is installed in any one from among the electronic apparatuses of the user, an event in which the specific user command is input to any one from among the electronic apparatuses of the user, and an event in which a specific function is performed in any one from among the electronic apparatuses of the user, may relate to the start event of context 1. More specific examples on the start event will be described in conjunction with descriptions on embodiments of FIGS. 3 to 10 below.

For example, various events such as an event in which a plurality of applications corresponding to context 1 is installed in at least one from among the electronic apparatuses of a user and one application therefrom is deleted thereafter, an event in which one from among the installed applications is not used for a certain period, an event in which a predetermined time has passed after the user context is identified as context 1, and an event in which a specific user command is input to any one from among the electronic apparatuses of the user, may correspond to the end event of context 1.

For example, context 1 may be 'game 'A' playing,' the start event on context 1 may be an event in which a user command requesting the purchase of 'game A' is input to a smartphone or a tablet personal computer (PC) from among the electronic apparatuses of the user, and the end event on context 1 may be an event in which the user does not play 'game A' for a certain time or period through the tablet PC or a desktop PC from among the electronic apparatuses of the user.

The memory 120 may be stored with various information related to the plurality of electronic apparatuses.

The memory 120 may store user information of each of the plurality of electronic apparatuses. The user information may include information on user ID, name, address, contact details, and the like of each of the plurality of electronic apparatuses.

In addition, the memory 120 may store location information of each of the plurality of electronic apparatuses, and the each of the plurality of electronic apparatuses may store information on a channel (e.g., IP band) or frequency connected to the communicator 110. In this respect, the processor 130 may also identify the user information or location information of the electronic apparatuses forming one network by being connected through the same channel or frequency as the same information.

The user information and/or location information of the plurality of electronic apparatuses may be received from the plurality of electronic apparatuses through the communicator 110.

The processor 130 may be a configuration for controlling overall each configuration comprised in the server 100, and may be implemented as a generic-purpose processor such as a central processing unit (CPU) and an application processor (AP), a graphics dedicated processor such as a graphics processing unit (GPU) and a vision processing unit (VPU), an artificial intelligence dedicated processor such as a neural processing unit (NPU), or the like. In addition, the processor 130 may include a volatile memory such as a static RAM (SRAM).

The processor 130 may, based on an installation information of a first application from among a plurality of applications being received from a first electronic apparatus from among the plurality of electronic apparatuses, identify a context corresponding to the first application, based on the information on the plurality of applications, identify a second application corresponding to the context from among the plurality of applications, and control the communicator 110 to transmit an installation command of the second application, to a second electronic apparatus capable of installing the second application from among the plurality of electronic apparatuses. In other word, the processor 130 may, based on a first application from among the plurality of applications corresponding to a specific user context being installed in a first electronic apparatus from among the plurality of electronic apparatuses, identify a second electronic apparatus in which a second application from among the plurality of applications corresponding to the corresponding user context is to be installed. The plurality of electronic apparatuses may include the same user information and/or the same location information.

The processor 130 may identify the electronic apparatus in which the second application may be installed from among the plurality electronic apparatuses based on information on the type, size, operating environment, name of product, and the like of the electronic apparatus in which the second application stored in the memory 120 may be installed.

The processor 130 may control the second electronic apparatus to cause the second application to be installed in the second electronic apparatus. In this case, the processor 130 may perform a push to cause the second application to be installed in the second electronic apparatus through the communicator 110. The push may generally refer to an operation of transmitting predetermined information under a certain condition without a user command.

As a specific example of a push with respect to an app installation, if the second application itself is stored in the memory 120, the processor 130 may transmit data including the second application to the second electronic apparatus through the communicator 110.

As another example of a push with respect to the app installation, if a provider of the second application is a separate external server, the processor 130 may control the second electronic apparatus to receive download of the second application from the external server. In this case, the processor 130 may transmit a control signal causing the second electronic apparatus to download the second application from the external server to the second electronic apparatus through the communicator 110.

The processor 130 may transmit information on a web address within the external server which is capable of receiving download of the second application through the communicator 110 to the second electronic apparatus. The processor 130 may be configured to control the communicator 110 to transmit a control signal causing the second electronic apparatus to receive download of the second application by connecting to the corresponding web site address to the second electronic apparatus.

The process of the above-described first application being installed in the first electronic apparatus may be divided largely into two cases. The first case may relate to FIG. 3, in which the first application is installed in the first electronic apparatus according to the user command input to the first electronic apparatus regardless of control by the server 100. The second case may relate to FIGS. 5 and 8, in which the server 100 identifies the user context of the plurality of electronic apparatuses, and controls the first electronic apparatus to cause the first application corresponding to the identified context to be installed.

The processor 130 may, when the first application is installed in the first electronic apparatus based on the user command input to the electronic apparatus, receive installation information indicating completion of the installation of the first application from the first electronic device. The processor 130 may identify the context corresponding to the first application based on information on the plurality of applications for each context stored in the memory 120. The processor 130 may identify a second application corresponding to the context from among the plurality of applications. The processor 130 may control the communicator 110 to transmit an installation command of the second application, to a second electronic apparatus capable of installing the second application from among the plurality of electronic apparatuses. In other words, the processor 130 may control the second electronic apparatus to cause the second application corresponding to the identified context to be installed in the second electronic apparatus.

An example of the installation of the application according to the user command and the process thereafter will be described through FIG. 3.

Figure 3:
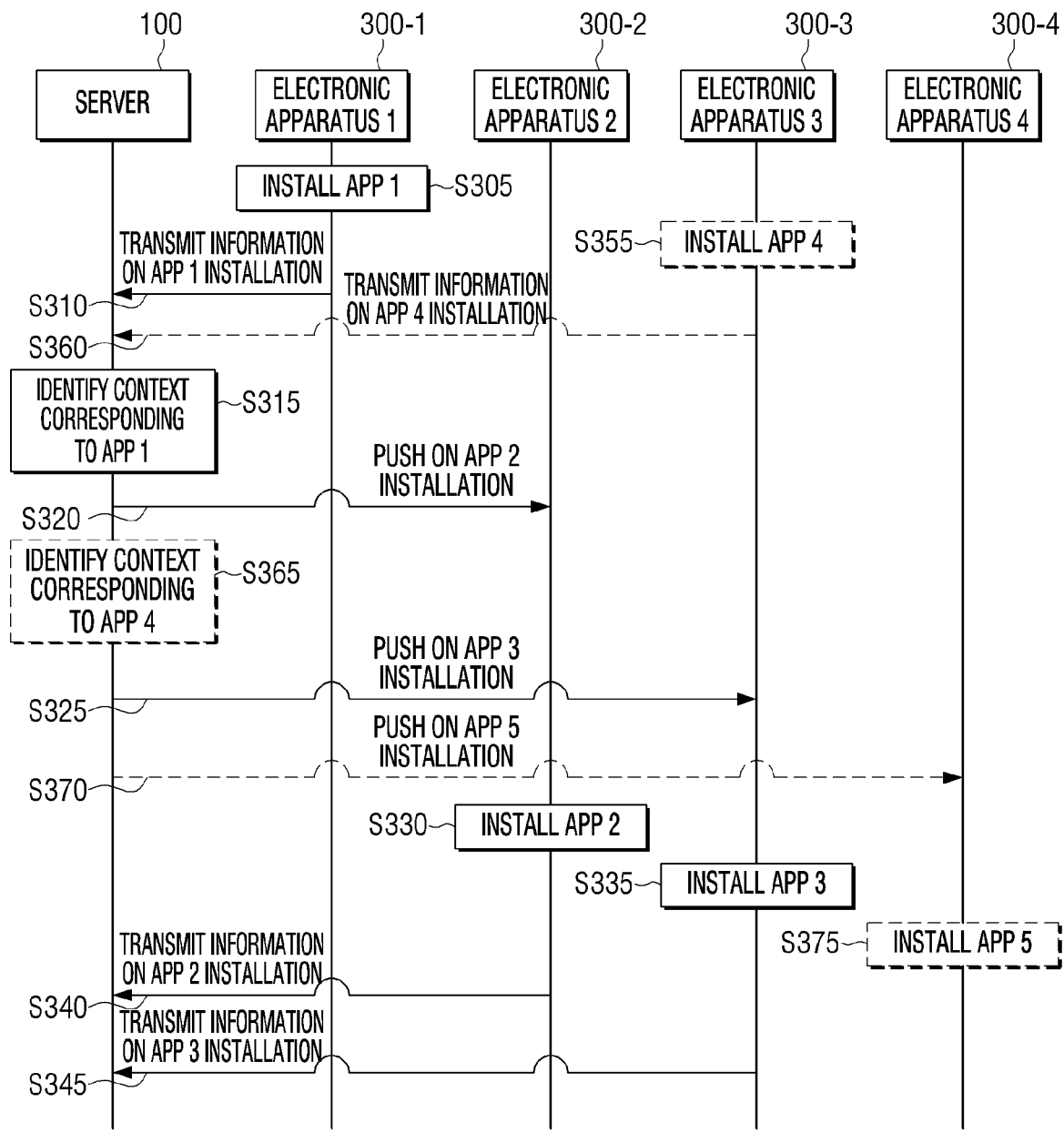
FIG. 3 illustrates a sequence diagram of a server configured to identify user context according to an application stored in one electronic apparatus from among a plurality of electronic apparatuses, and control to cause another application corresponding to the identified context to be installed in another electronic apparatus from among a plurality of electronic apparatuses according to an embodiment of the disclosure.

Referring to FIG. 3 the server may connect with electronic apparatuses 1 to 4 300-1, 300-2, 300-3 and 300-4 through the communicator 110. The user information and/or location information of each of the electronic apparatuses 1 to 4 300-1, 300-2, 300-3 and 300-4 may match one another.

Alternatively, based on the electronic apparatuses 1 to 4 300-1, 300-2, 300-3 and 300-4 being interconnected to the communicator 110 through the same relay device, the server 100 may identify the user information and/or location information of the electronic apparatuses 1 to 4 300-1, 300-2, 300-3 and 300-4 connected through the same IP as a match.

Referring to FIG. 3, first, app 1 may be installed in the electronic apparatus 300-1 according to the user command input to electronic apparatus 1 300-1 (S305). The user command may be input in various forms such as a touch, a sound, or a motion.

Alternatively, based on a user command being input to a remote control device (not shown) for controlling electronic apparatus 1 300-1, app 1 may be installed in electronic apparatus 1 300-1 as a result of the signal according to the user command being received in the electronic device 1 300-1 from the remote control device.

Based on information on app 1 installation being received from electronic apparatus 1 300-1 (S310), the processor 130 may identify that app 1 is installed in electronic apparatus 1 300-1, and identify a first context corresponding to app 1 (S315). The processor 130 may identify the first context corresponding to app 1 by using information on the plurality of applications stored for each user context stored in the memory 120.

The processor 130 may, by using the information on the electronic apparatus in which each of the plurality of applications stored in the memory 120 may be installed, identify the electronic apparatus in which each of the plurality of applications corresponding to the first context from among electronic apparatuses 1 to 4 300-1, 300-2, 300-3 and 300-4 may be installed.

Accordingly, the processor 130 may respectively identify electronic apparatus 2 300-2 and electronic apparatus 3 300-3 in which app 2 and app 3 may be respectively installed from among the plurality of applications corresponding to the first context. Because app 1 has already been installed in electronic apparatus 1 300-1, the processor 130 may no longer identify the electronic apparatus in which app 1 from among the plurality of applications corresponding to the first context is to be installed.

The processor 130 may perform a push to cause electronic apparatus 2 300-2 and electronic apparatus 3 300-3 to install app 2 and app 3 respectively through the communicator 110 (S320, S325).

Accordingly, electronic apparatus 2 300-2 and electronic apparatus 3 300-3 may be installed with app 2 and app 3 respectively (S330, S335), and electronic apparatus 2 300-2 and electronic apparatus 3 300-3 installed with app 2 and app 3 may transmit information on the installation result to the server 100 (S340, S345)

The information on the plurality of applications corresponding to each user context stored in the memory 120 may include a processing attribute of each of the plurality of applications and/or information on a priority order of the plurality of applications.

For example, the processing attribute of app 2 may be 'urgent (mandatory)' and the processing attribute of app 3 may be 'normal.' In this case, based on the processor 130 performing a push of installation of app 2 in electronic apparatus 2 300-2, the installation of app 2 may proceed regardless of user command with respect to electronic apparatus 2 300-2. On the other hand, app 3 may be installed in electronic apparatus 3 300-3 only when a separate user command agreeing to the installation of app 3 is finally input to electronic apparatus 3 300-3 after the processor 130 performs a push of the installation of app 3 to electronic apparatus 3 300-3.

For example, based on a priority order of app 2 preceding that of app 3 with respect to the first context, the processor 130 may perform a push to cause app 3 to be installed in electronic apparatus 3 300-3 after a push for installation of app 2 in electronic apparatus 2 300-2 is performed. In this case, the app 2 installation in electronic apparatus 2 300-2 may be faster than the app 3 installation in electronic apparatus 3 300-3.

Independent from the process of app 1 being installed in electronic apparatus 1 300-1, app 4 may be installed in electronic apparatus 3 330-3 by a user command, or the like input to electronic apparatus 3 300-3 (S355).

In this case, independent from the processes of S305 to S345 described above, the server 100 which received information on app 4 installation (S360) may identify the second context corresponding to app 4 (S365), and perform a push on electronic apparatus 4 300-4 for app 5 which is another application corresponding to the identified second context to be installed (S370). Accordingly, electronic apparatus 4 300-4 may install app 5 (S375).

As described above, the user context of the plurality of electronic apparatuses 300-1, 300-2, 300-3 and 300-4 may not necessarily correspond to one context at a point in time, and may correspond to a plurality of contexts simultaneously. Accordingly, the plurality of electronic apparatuses 300-1, 300-2, 300-3 and 300-4 may be independently provided with all of the app installation services (S305 to S345, S355 to S375) corresponding to each of the different contexts from the server 100.

Unlike FIG. 3, the user context of the plurality of electronic apparatuses 300-1, 300-2, 300-3 and 300-4 may be identified by any one from among the plurality of electronic apparatuses 300-1, 300-2, 300-3 and 300-4 and not the server 100. In an example, in a state in which app 1 is installed in the electronic apparatus 300-1 by user command, the electronic apparatus 300-1 may identify the user context as the first context based on information on the installed app 1. Based on the electronic apparatus 300-1 transmitting information on the identified first context to the server 100, the server 100 may identify the user context of the plurality of electronic apparatuses 300-1 as the first context.

Figure 4:
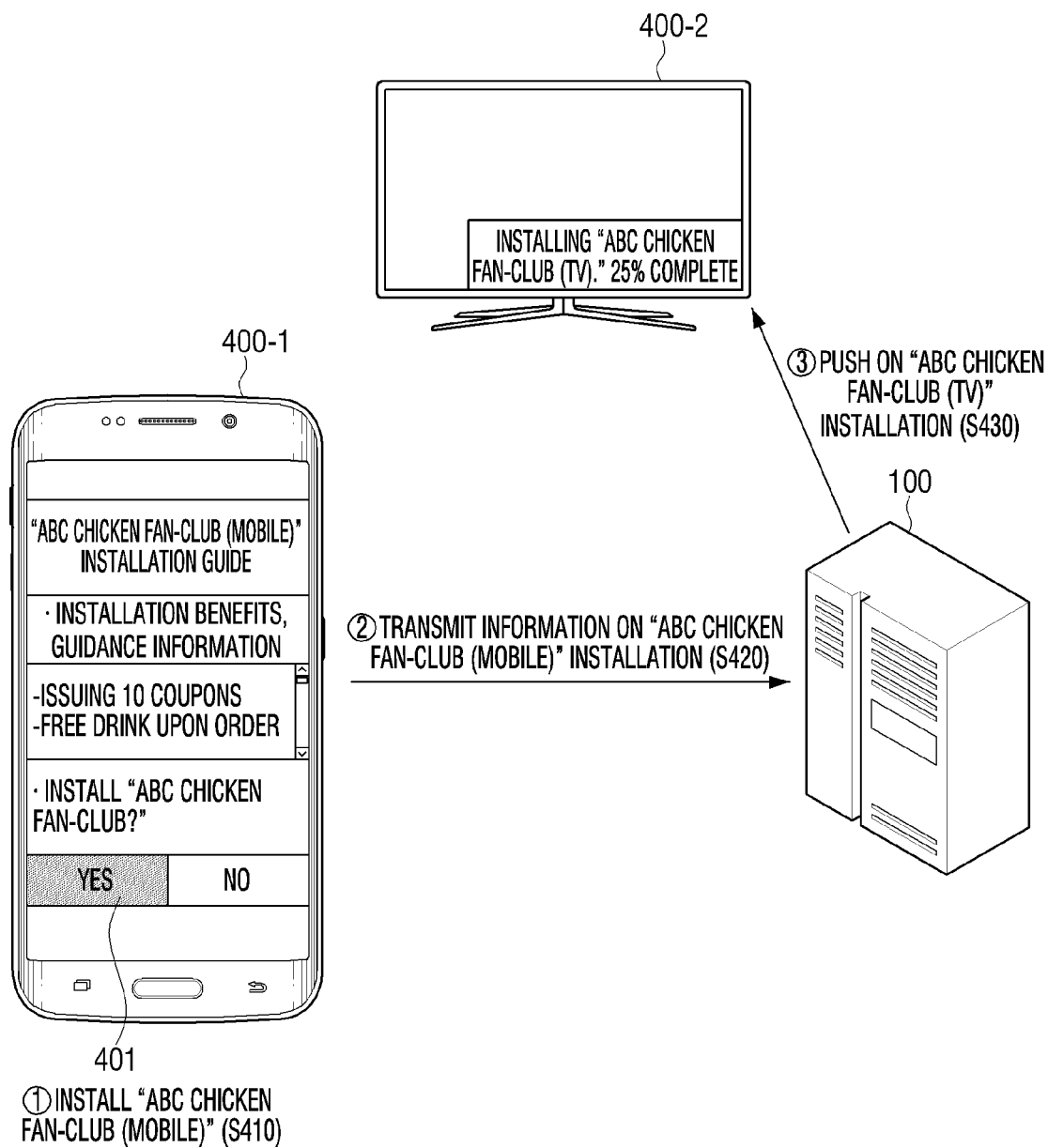
FIG. 4 illustrates a diagram, which is a more detailed diagram of the embodiment of FIG. 3, of an example operation of a server configured to install an application on electronic apparatuses used in the daily life of a user according to an embodiment of the disclosure.

FIG. 4 illustrates a diagram, which is a more detailed diagram of the embodiment of FIG. 3, of an example operation of a server configured to install an application in electronic apparatuses used in the daily life of a user according to an embodiment of the disclosure.

FIG. 4 is based on a user touch agreeing to the installation of "ABC chicken fan-club (mobile)" app being input to an area 401 on the display. The "ABC chicken fan-club (mobile)" app may be installed in the smartphone 400-1 according to the user touch (S410).

The server 100 which received information on installation of "ABC chicken fan-club (mobile)" (App) from the smartphone 400-1 (S420) may identify the user context corresponding to "ABC chicken fan-club (mobile)" as, for example, 'ABC chicken fan-club registration' context.

The server 100 may identify a "ABC chicken fan-club (TV)" (App), which is another application corresponding to the identified context, and perform a push to cause the TV 400-2 to install the "ABC chicken fan-club (TV)."

The processor 130 may receive information on the user command input to at least one from among the plurality of electronic apparatuses through the communicator 110, and identify the user context based on the information on the received user command. The processor 130 may then control the first electronic apparatus to cause the first application from among the plurality of applications corresponding to the identified context to be installed in the first electronic apparatus.

Through FIG. 5, an example of an operating process of a server that identified context according to user command which is input to at least one from among the plurality of electronic apparatuses will be described.

Figure 5:
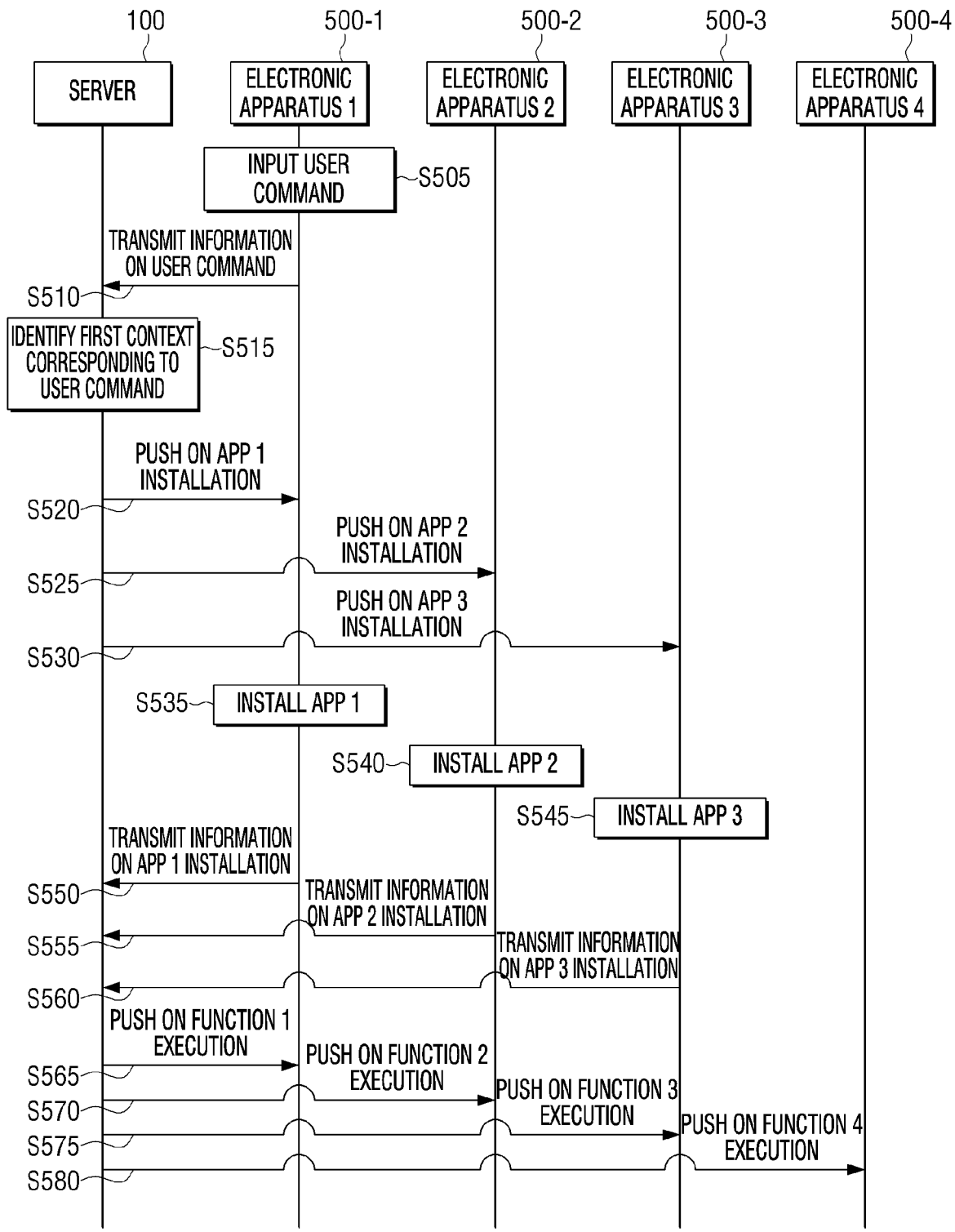
FIG. 5 illustrates a sequence diagram of a server configured to identify a user context according to a user command input to one electronic apparatus from among a plurality of electronic apparatuses, and control to cause a plurality of applications corresponding to the identified context to be installed in a plurality of electronic apparatuses according to an embodiment of the disclosure.

Referring to FIG. 5, the server 100 may be connected with electronic apparatuses 1 to 4 500-1, 500-2, 500-3 and 500-4 through the communicator 110. The user information and/or location information of each of the electronic apparatuses 1 to 4 500-1, 500-2, 500-3 and 500-4 may match one another.

Alternatively, based on electronic apparatuses 1 to 4 500-1, 500-2, 500-3 and 500-4 being connected with the communicator 110 through the same relay device, the server 100 may identify the user information and/or location information of electronic apparatuses 1 to 4 500-1, 500-2, 500-3 and 500-4 connected through the same IP as a match.

Based on the user command being input to electronic apparatus 1 500-1 (S505), the server 100 may receive information on the input user command (S510). The user command may be a command for selecting at least one (user) context. The user command may be received in electronic apparatus 1 500-1 in the form of a touch, sound, motion, or the like. It may also be possible for the information on the user command to be transmitted to the server 100 based on the user command being input to at least one from among the other electronic apparatuses 500-2, 500-3 and 500-5 other than electronic apparatus 1 500-1.

Further, the server 100 may identify the first context corresponding to the user command (S515). The server 100 may identify that the user context of electronic apparatuses 1 to 4 500-1, 500-2, 500-3 and 500-4 corresponds to the first context.

Based on a QR code or barcode recorded in an external apparatus or an external object being recognized (by the user) through a scanner or a camera provided in electronic apparatus 1 500-1, the information on the recognition result may be transmitted to the server 100, and the server 100 may identify that the user context of electronic apparatuses 1 to 4 500-1, 500-2, 500-3 and 500-4 corresponds to the first context according to the recognition result.

Alternatively, based on a magnet provided in the external apparatus or the external object being NFC-tagged in electronic apparatus 1 300-1 by the user, the information input through the NFC tag may be transmitted to the server 100. In this case, the server 100 may identify that the user context of electronic apparatuses 1 to 4 500-1, 500-2, 500-3 and 500-4 corresponds to the first context by using the information received based on the NFC tag. For example, based on the user performing NFC-tagging on a promotional product (including the magnet) received from operator of 'BCD chicken' in the electronic apparatus 500-1 which is implemented as a smartphone, the applications related to advertisements/promotions/events of 'BCD chicken' may be installed in at least one from among the electronic apparatuses 500-1, 500-2, 500-3 and 500-4 of the user.

Further, the processor 130 may, by using information on the electronic apparatus in which each of the plurality of applications stored in the memory 120 may be installed, identify the electronic apparatus in which each of the plurality of applications corresponding to the first context may be installed from among the electronic apparatuses 1 to 4 500-1, 500-2, 500-3 and 500-4.

Accordingly, the processor 130 may identify each of electronic apparatuses 1 to 3 500-1, 500-2 and 500-3 in which app 1 to app 3 from among the plurality of applications corresponding to the first context may be respectively installed.

The processor 130 may then perform a push to cause app 1 to app 3 to be installed in each of electronic apparatuses 1 to 3 500-1, 500-2 and 500-3 (S520, S525, S530).

The server 100 may not perform a push on the app installation with respect to electronic apparatus 4 500-4. Here, electronic apparatus 4 500-4 may already be installed with an app corresponding to the first context, or electronic apparatus 4 500-4 may be an electronic apparatus in which the plurality of applications corresponding to the first context may not be installed.

Based on performing a push, information on app 3 to app 5 being installed in electronic apparatuses 1 to 3 500-1, 500-2 and 500-3 (S535, 5540, S545), and electronic apparatuses 1 to 3 500-1, 500-2 and 500-3 being installed with apps may be transmitted to the server 100 (S550, 5555, S560). The order and/or process of app 3 to app 5 being installed in electronic apparatuses 1 to 3 500-1, 500-2 and 500-3 may vary according to the priority order of app 3 to app 5 stored in the memory 120 and/or the processing attribute of each of app 3 to app 5.

The server 100 may identify the plurality of functions corresponding to the first context by using information on the plurality of functions corresponding to each user context stored in the memory 120.

Referring to FIG. 5, the server 100 may identify functions (e.g., function 1, function 2, function 3 and function 4) corresponding to the first context from among the functions of each of the plurality of applications (e.g., app 1, app 2, app 3, app already installed in electronic apparatus 4 500-4) corresponding to the first context. The memory 120 may be stored with information on the function corresponding to the first context of the user with respect to each of the plurality of applications (e.g., app 1, app 2, app 3, etc.).

Accordingly, the server 100 may perform a push on each of electronic apparatuses 1 to 4 500-1, 500-2, 500-3 and 500-4 to cause electronic apparatuses 1 to 4 500-1, 500-2, 500-3 and 500-4 to perform function 1, function 2, function 3, and function 4 through each of the installed applications (S565, 5570, S575, S580). Based on performing a push to cause the specific electronic apparatus to perform a certain function, the server 100 may transmit information on the function to be performed to the corresponding apparatus. Specifically, the server 100 may transmit information on which function is to be performed to the corresponding apparatus, and information on the condition (e.g., time, state of electronic apparatus in which the corresponding function is to be performed, state of other electronic apparatuses, etc.) for performing the corresponding function may also be transmitted to the corresponding apparatus.

The operations (S565 to S580) of the above-described server that performs a push to cause the functions corresponding to the identified context to be performed may be performed in a similar manner with respect to electronic apparatuses 300-1, 300-2, 300-3 and 600-4 after operations S340 and S345 in FIG. 3.

Figure 6:
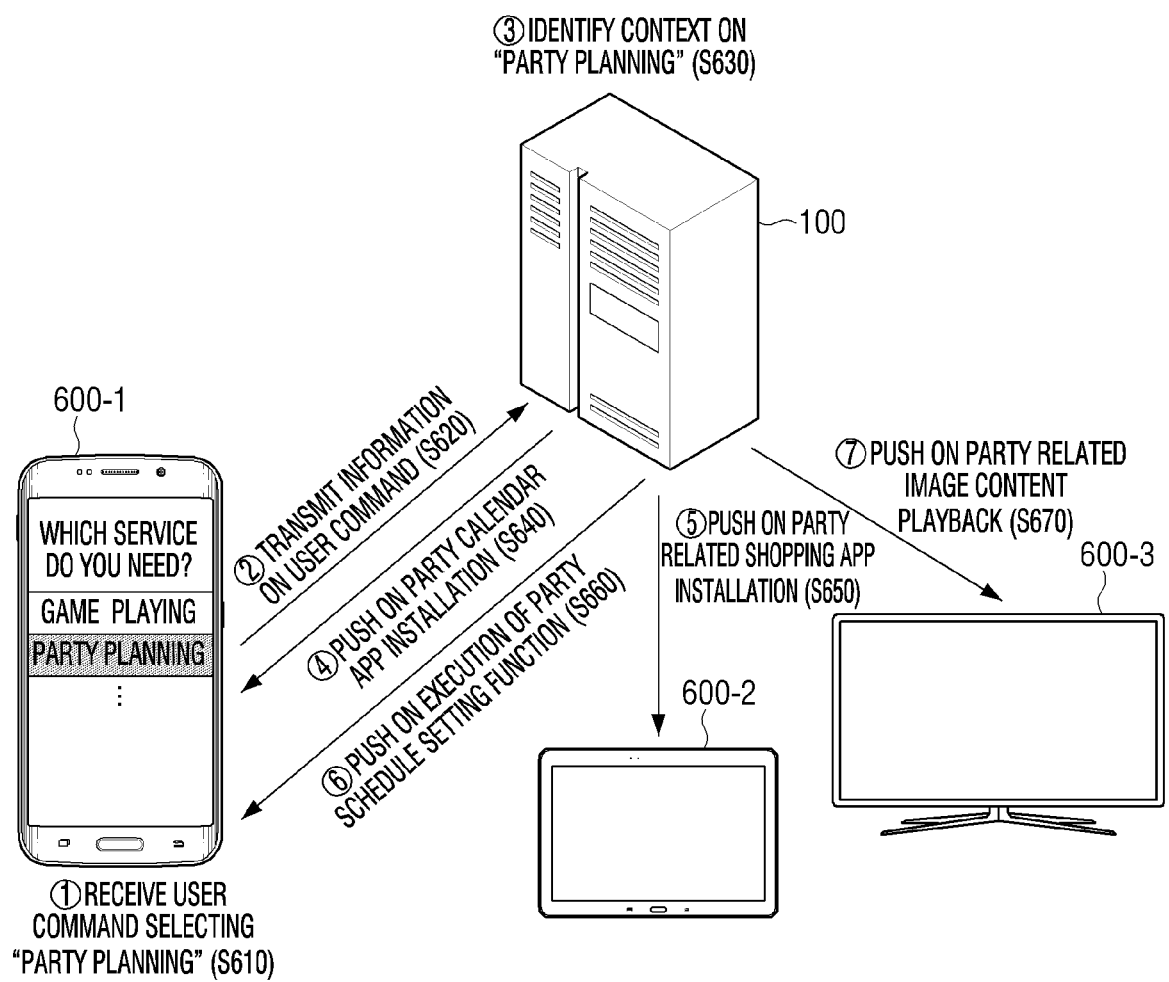
FIG. 6 illustrates a diagram, which is a more detailed diagram of the embodiment of FIG. 5, of an example operation of a server configured to cause an application to be installed in electronic apparatuses used in the daily life of a user based on a context according to a user command according to an embodiment of the disclosure.

FIG. 6 illustrates a diagram, which is a more detailed diagram of the embodiment of FIG. 5, of an example operation of a server configured to cause an application to be installed in electronic apparatuses used in the daily life of a user based on a context according to a user command according to an embodiment of the disclosure.

Referring to FIG. 6, the smartphone 600-1 which received input of the user command having selected 'party planning' (S610) may transmit information on the user command to the server 100 (S620). The server 100 may identify that the user context of the electronic apparatuses 600-1, 600-2 and 600-3 is 'party planning' according to the user command (S630).

In this case, the server 100 may perform a push to cause a 'party calendar' (App) corresponding to the 'party planning' context to be installed in the smartphone 600-1, and a party related shopping app to be installed in the tablet PC 600-2 (S640, S650).

The server 100 may then perform a push on the smartphone 600-1 to cause the 'party schedule setting' function corresponding to the 'party planning' context to be executed through the 'party calendar' (App) (S660).

In addition, the server 100 may perform a push on the TV 600-3 to cause the 'party related image content playback' function corresponding to the 'party planning' context to be performed (S670). Accordingly, the TV 600-3 may playback the party related image content.

Based on information on the content corresponding to 'party planning' context being stored in the memory 120, the server 100 may be configured to control the TV 600-3 to playback the corresponding content. Specifically, based on the server 100 transmitting information on a content name of the corresponding content or a website address for receiving the corresponding content, or the like to the TV 600-3, the TV 600-3 may playback the corresponding content.

When the user context of the plurality of electronic apparatuses are identified and the first application and the second application are installed in electronic apparatus 1 and electronic apparatus 2 respectively, the processor 130 may identify the respective conditions for a first function of the first application and a second function of the second application corresponding to the identified context to be performed. In this case, the processor 130 may use the information on the plurality of functions corresponding to the identified context stored in the memory 120.

The processor 130 may, by using information on the condition for performing each of the plurality of functions from among information on the plurality of functions corresponding to the identified context, identify a time for the first function and the second function to be executed, and control the first electronic apparatus and the second electronic apparatus to execute the first function and the second function through the first application and the second application at the identified time.

Figure 7:
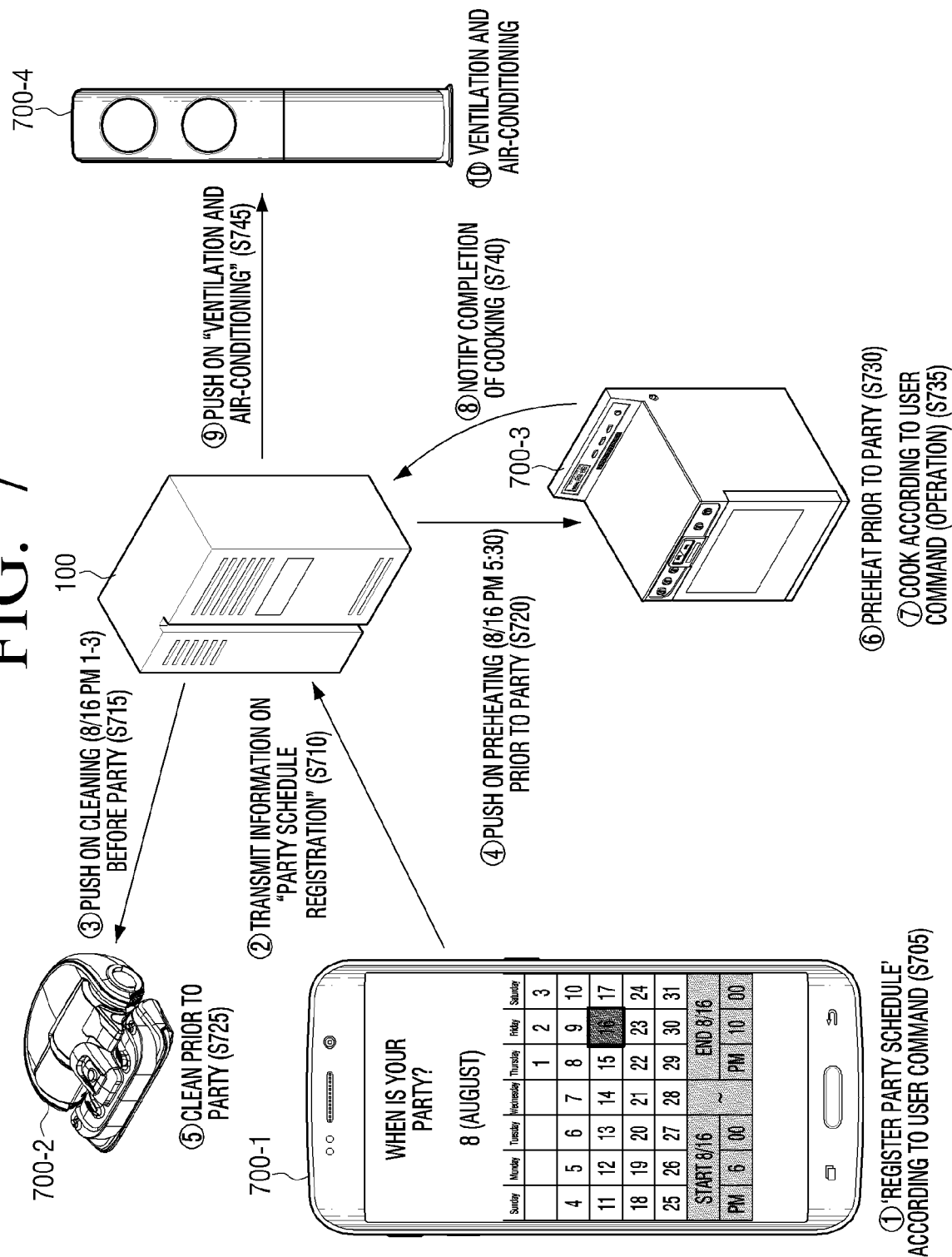
FIG. 7 illustrates a diagram of an example operation of a server controlling for functions corresponding to context to be executed in a plurality of electronic apparatuses while in a state in which applications have been installed to each of the electronic apparatuses used in the daily life of a user according to an embodiment of the disclosure.

FIG. 7 illustrates a diagram of an example operation of a server controlling for functions corresponding to context to be executed in the plurality of electronic apparatuses while applications have been installed to each of the electronic apparatuses used in the daily life of the user according to an embodiment of the disclosure.

FIG. 7 is based on the server 100 identifying that the user context of the plurality electronic apparatuses 700-1, 700-2, 700-3 and 700-4 is 'party planning.'

Referring to FIG. 7, the smartphone 700-1 may execute the function 'register party schedule' through 'party calendar' (app) according to user command (S705). The server 100 may identify that the party schedule is '8/16 PM 6-10' by receiving information on 'register party schedule' (S710) executed from the smartphone 700-1.

In this case, the server 100 may not only identify the functions (e.g., cleaning, preheating, ventilating and cooling) to be executed by each of a robot cleaner 700-2, an oven 700-3, and an air conditioner 700-4 by using the 'party planning' context, but also identify the time at which the corresponding functions may be performed by using the party schedule registered by the user command.

By using the information on the condition for the plurality of functions to be performed from among information on the plurality of functions corresponding to 'party planning' stored in the memory 120, the processor 130 may identify a condition that cleaning by the robot cleaner corresponding to 'party planning' must be performed for 2 hours 5 hours prior to the party starting, a condition that preheating of the oven corresponding to 'party planning' must be performed 30 minutes prior to the party starting, and a condition that ventilation and cooling of the air conditioner corresponding to 'party planning' must be performed after cooking by the oven is completed.

Accordingly, referring to FIG. 7, the server 100 may perform a push to cause the robot cleaner 700-2 to clean (8/16 PM 1-3) prior to the party (S715), and perform a push to cause the oven 700-3 to start preheating (8/16 PM 5:30) prior to the party (S720). Thereby, cleaning and preheating oven prior to the party may be performed by the robot cleaner 700-2 and the oven 700-3 (S725, S730).

The preheated oven 700-3 may perform cooking by user operation input to the oven 700-3 (S735). Then, when the cooking by the user operation is completed, the oven 700-3 may notify the same to the server 100 (S740). In this case, the oven 700-3 may only transmit information on the completion of cooking at the time the cooking is completed to the server 100, or based on transmitting information on the real-time state (e.g., power on, standby mode, cooking (10 minutes left), preheating, etc.) of the oven 700-3 to the server, the server 100 may identify the time of cooking completion.

The server 100 may, because the cooking by the oven has been completed, perform a push to cause the air conditioner 700-4 to perform ventilation and cooling (S745). Accordingly, the air conditioner 700-4 may perform ventilation and cooling (S750).

Although FIG. 7 is described based on the identified context being maintained in a 'party planning' state, from the time the party starts according to the registered party schedule, the server 100 may also identify the user context of the electronic apparatuses 700-1, 700-2, 700-3 and 700-4 as "in party" which is differentiated from 'party planning.' In this case, the ventilation and cooling function of the air conditioner 700-4 may be a function corresponding to the 'in party' context.

The processor 130 may update information on the context stored in the memory 120 according to the user command input to at least one from among the plurality of electronic apparatuses.

In an example, based on information on the plurality of applications corresponding to the first context stored in the memory 120, by controlling the first electronic apparatus and the second electronic apparatus to cause the server 100 to install each of the first application and the second application from among the plurality of applications corresponding to the first context, the first application and the second application may be installed in each of the first electronic apparatus and the second electronic apparatus.

If the second application is deleted by the user command input to the second electronic apparatus, the server 100 may receive information notifying that the second application has been deleted from the second electronic apparatus, and delete information on the second application from the information on the plurality of applications corresponding to the first context stored in the memory 120.

In another example, based on information on the plurality of functions corresponding to the first context stored in the memory 120, the server 100 may perform a push to cause the first function corresponding to the first context to be performed in the first electronic apparatus through the first application, and a push to cause the second function corresponding to the first context to be performed in the second electronic apparatus through the second application.

If a third function other than the second function is additionally executed in the second electronic apparatus by the user command input to the second electronic apparatus, the processor 130 may receive information on the executed third function from the second electronic apparatus, and add information on the third function to the information on the plurality of functions corresponding to the first context stored in the memory 120. If the third function is executed on the second application, the processor 130 may add the third function to the information on the function of the second application corresponding to the first context stored in the memory 120.

If the execution of the second function is cancelled by the user command input to the second electronic apparatus, the processor 130 may receive information notifying that the second function has been cancelled from the second electronic apparatus, and delete information on the second function from the information on the plurality of functions corresponding to the first context stored in the memory 120. Specifically, the processor 130 may delete the information on the second function from the information on the function of the second application corresponding to the first context.

As described above, based on information on the context stored in the memory being updated, if in case the first context reoccurs thereafter, the processor 130 may perform a push on the plurality of electronic apparatuses for the installation of the plurality of applications and the execution of the plurality of functions by using the updated information.

Based on a function according to the user command being executed in the first electronic apparatus from among the plurality of electronic apparatuses, when information on the executed function is received from the first electronic apparatus, the processor 130 may identify the context corresponding to the executed function as the user context of the plurality of electronic apparatuses. Then, the processor 130 may, based on the identified context, perform a push on the plurality of electronic apparatuses for the installation of the plurality of applications and the execution of the plurality of functions.

Figure 8:
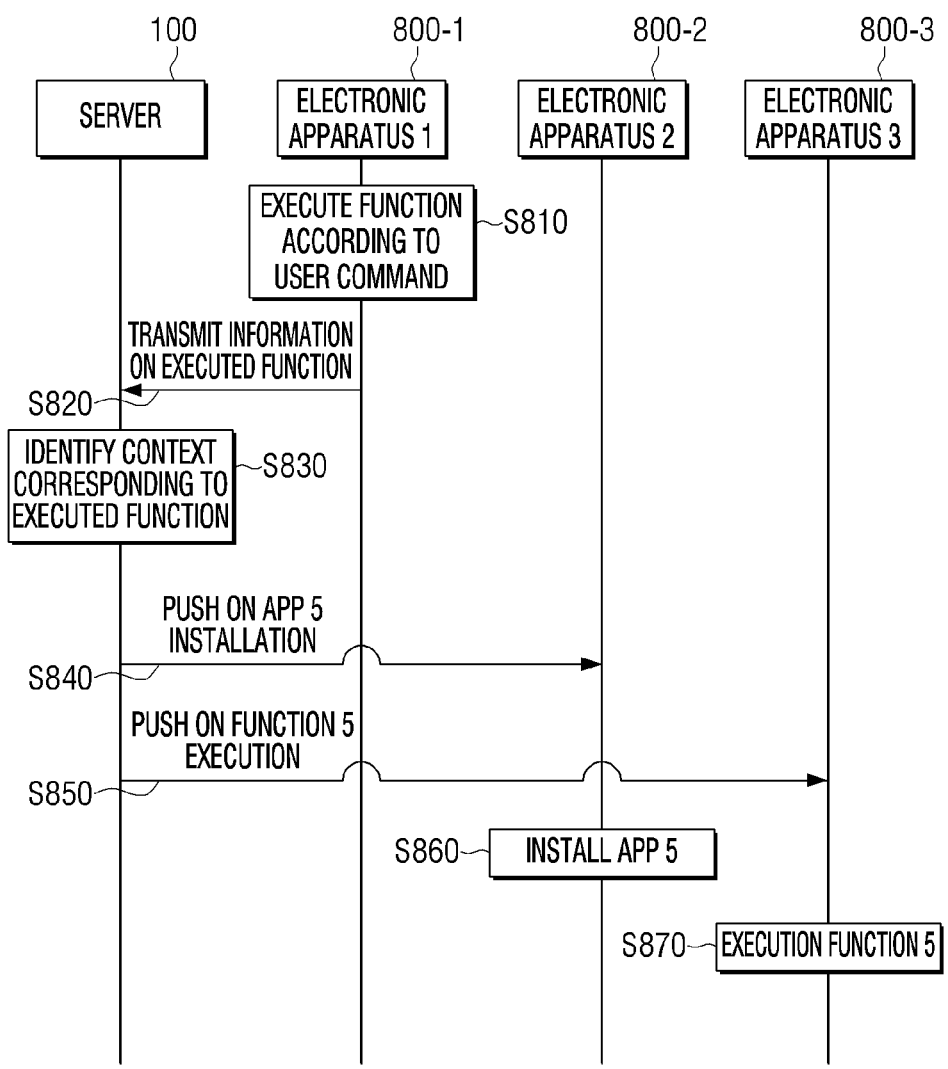
FIG. 8 illustrates a sequence diagram of a server configured to identify context taking into consideration a function performed by a user command in one electronic apparatus from among a plurality of electronic apparatuses, and control to cause applications corresponding to the identified context to be installed in a plurality of electronic apparatuses according to an embodiment of the disclosure.

FIG. 8 illustrates a sequence diagram of the server configured to identify context taking into consideration the function performed by the user command in one electronic apparatus from among the plurality of electronic apparatuses, and control to cause applications corresponding to the identified context to be installed in the plurality of electronic apparatuses according to an embodiment of the disclosure.

In FIG. 8, the server 100 may be connected with electronic apparatuses 1 to 3 800-1, 800-2 and 800-3 through the communicator 110. The user information and/or the location information of each of electronic apparatuses 1 to 3 800-1, 800-2 and 800-3 may match one another.

Alternatively, based on electronic apparatuses 1 to 3 800-1, 800-2 and 800-3 being connected to the communicator 110 by being connected to the same relay device with one another, the processor 130 may identify the user information and/or location information of electronic apparatuses 1 to 3 800-1, 800-2 and 800-3 connected through one network of the same IP band as matching one another.

Referring to FIG. 8, based on a function corresponding to the user command being executed in electronic apparatus 1 800-1 according to the user command input to electronic apparatus 1 800-1 (S810), the server 100 may receive information on the executed function from electronic apparatus 1 800-1.

Then, by using the information on the plurality of functions corresponding to each context stored in the memory 120, the server 100 may identify the context corresponding to the executed function as the user context of electronic apparatuses 1 to 3 800-1, 800-2 and 800-3 (S830).

The server 100 may perform a push to cause app 5 from among the plurality of applications corresponding to the identified context to be installed in electronic apparatus 2 800-2 (S840).

In addition, the server 100 may perform a push to cause function 5 from among the plurality of functions corresponding to the identified context to be executed in electronic apparatus 3 800-3 (S850).

Accordingly, app 5 may be installed in electronic apparatus 2 800-2 (S860), and function 5 may be executed in electronic apparatus 3 800-3 (S870).

Figure 9:
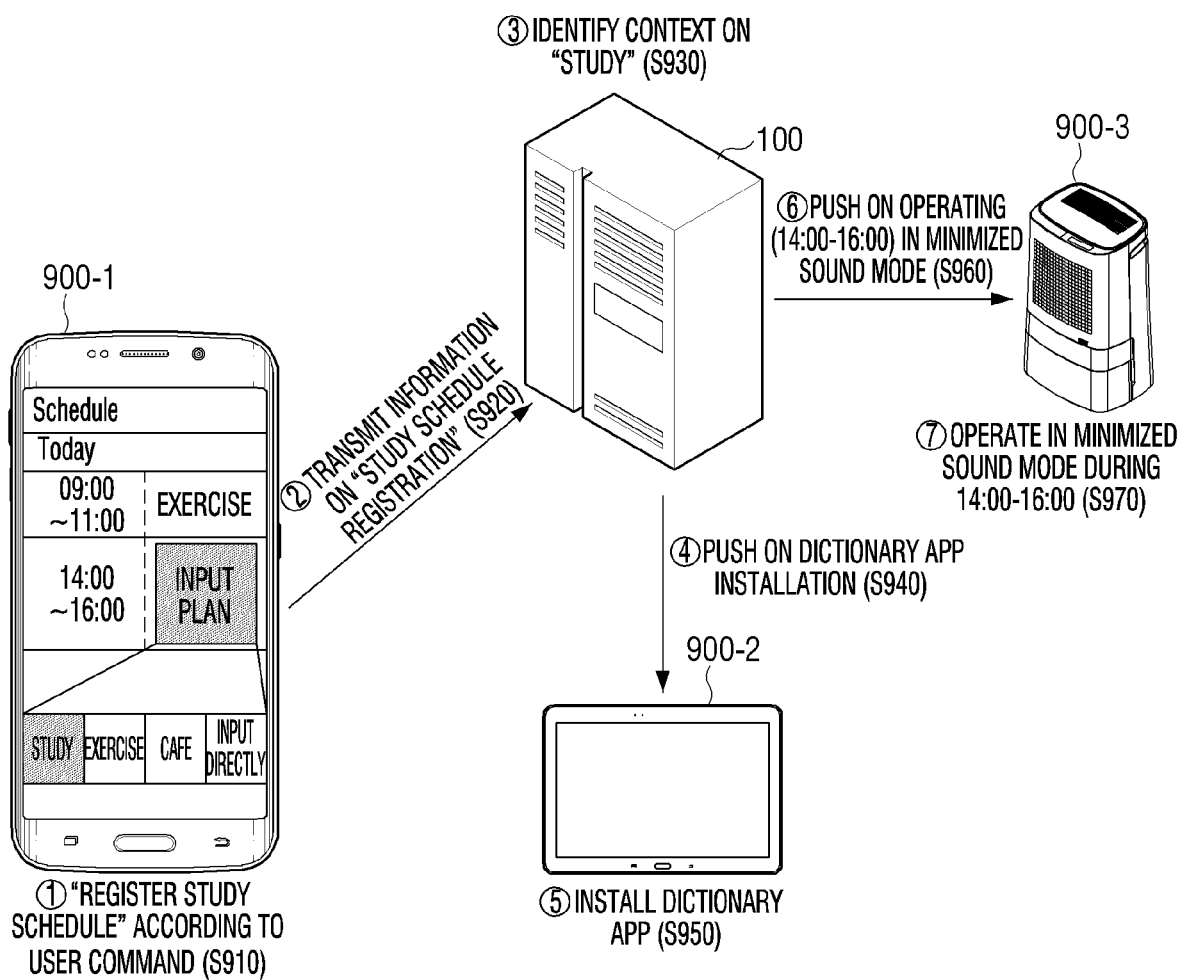
FIG. 9 illustrates a diagram, which is a more detailed diagram of the embodiment of FIG. 8, of an example operation of a server configured to, based on the context identified according to the performed function, cause an application to be installed in the electronic apparatuses used in the daily life of a user according to an embodiment of the disclosure.

FIG. 9 illustrates a diagram, which is a more detailed diagram of the embodiment of FIG. 8, of an example operation of the server configured to, based on the context identified according to the performed function, cause an application to be installed in the electronic apparatuses used in the daily life of the user according to an embodiment of the disclosure.

Referring to FIG. 9, a user command selecting study in the planning of 'today 14:00-16:00' through a schedule app on the smartphone 900-1 may be input. Accordingly, the smartphone 900-1 may perform the function of registering 'study schedule' at 'today 14:00-16:00' (S910).

In this case, the server 100 may receive information that the function 'register study schedule' has been performed from the smartphone 900-1 (S920). The server 100 may receive information that the study schedule has been registered to 'today 14:00-16:00' from the smartphone 900-1.

Then, the server 100 may identify that as of 'today 14:00,' the user context of the electronic apparatuses 900-1, 900-2 and 900-3 is 'study' context.

In this case, the server 100 may perform a push to cause a dictionary app corresponding to the identified 'study' context to be installed in the tablet PC 900-2 (S940). Accordingly, the dictionary app may be installed in the tablet PC 900-2.

In addition, the server 100 may, based on the identified 'study' context and the study schedule (e.g., 14:00-16:00), perform a push to cause an air purifier 900-3 to operate at a minimized sound mode during 14:00-16:00 (S960). Accordingly, the air purifier 900-3 may operate at the minimized sound mode during 14:00-16:00 (S970).

The processor 130 may be configured to, based on the identified context being completed, control the plurality of electronic apparatuses to delete all applications installed in the plurality of electronic apparatuses through a push.

The processor 130 may be configured to, based on the first application being installed in the first electronic apparatus according to the first context and the second application being installed in the second electronic apparatus, identify that the first context has been completed and perform a push on the first electronic apparatus and the second electronic apparatus to delete each of the first application and the second application when an event matching the end event of the first context stored in the memory 120 is generated.

The end event of the first context may, for example, be an event in which the first application or the second application is deleted by the user command input to the first electronic apparatus or the second electronic apparatus, an event in which a function not associated with the first context may be performed by the user command input to the first electronic apparatus or the second electronic apparatus, an event in which an end point in time of the first context registered according to the user command input to the first electronic apparatus or the second electronic apparatus arrives, or the like, but is not limited thereto.

For example, based on a specific function being performed in the first electronic apparatus according to the user command input to the first electronic apparatus from among the plurality of electronic apparatuses, the server 100 may identify the first context corresponding to the corresponding function. The server 100 may perform a push on the plurality electronic apparatuses for the installation of the plurality of applications and execution of the plurality of functions according to the identified first context.

However, if the function performed according to the user command input to the first electronic apparatus is completed by a lapse of time or by another user command, the server 100 may identify as the first context of the user of the plurality of electronic apparatuses being completed.

In the embodiments below, embodiments of the server 100 being configured to control the plurality of electronic apparatuses if at least one user information and/or location information from among the plurality of electronic apparatuses is not a match will be described in detail.

The memory 120 may store information on a plurality of groups in which the plurality of electronic apparatuses is divided into based on at least one from among the location information of the plurality of electronic apparatuses and the user information of the plurality of electronic apparatuses.

Specifically, the electronic apparatuses with the same user information and/or location information with one another from among the plurality of electronic apparatuses may be included in the same group.

The processor 130 may be configured to identify the user context for each group respectively, and perform a push for each group of the plurality of applications or plurality of functions corresponding to the user context identified for each group.

The processor 130 may be configured to identify the user context on the first group from among the plurality of groups, and control the plurality of electronic apparatuses belonging to the first group to cause the plurality of applications corresponding to the user context on the identified first group to be installed in at least one from among the plurality of electronic apparatuses belonging to the first group.

Figure 10:
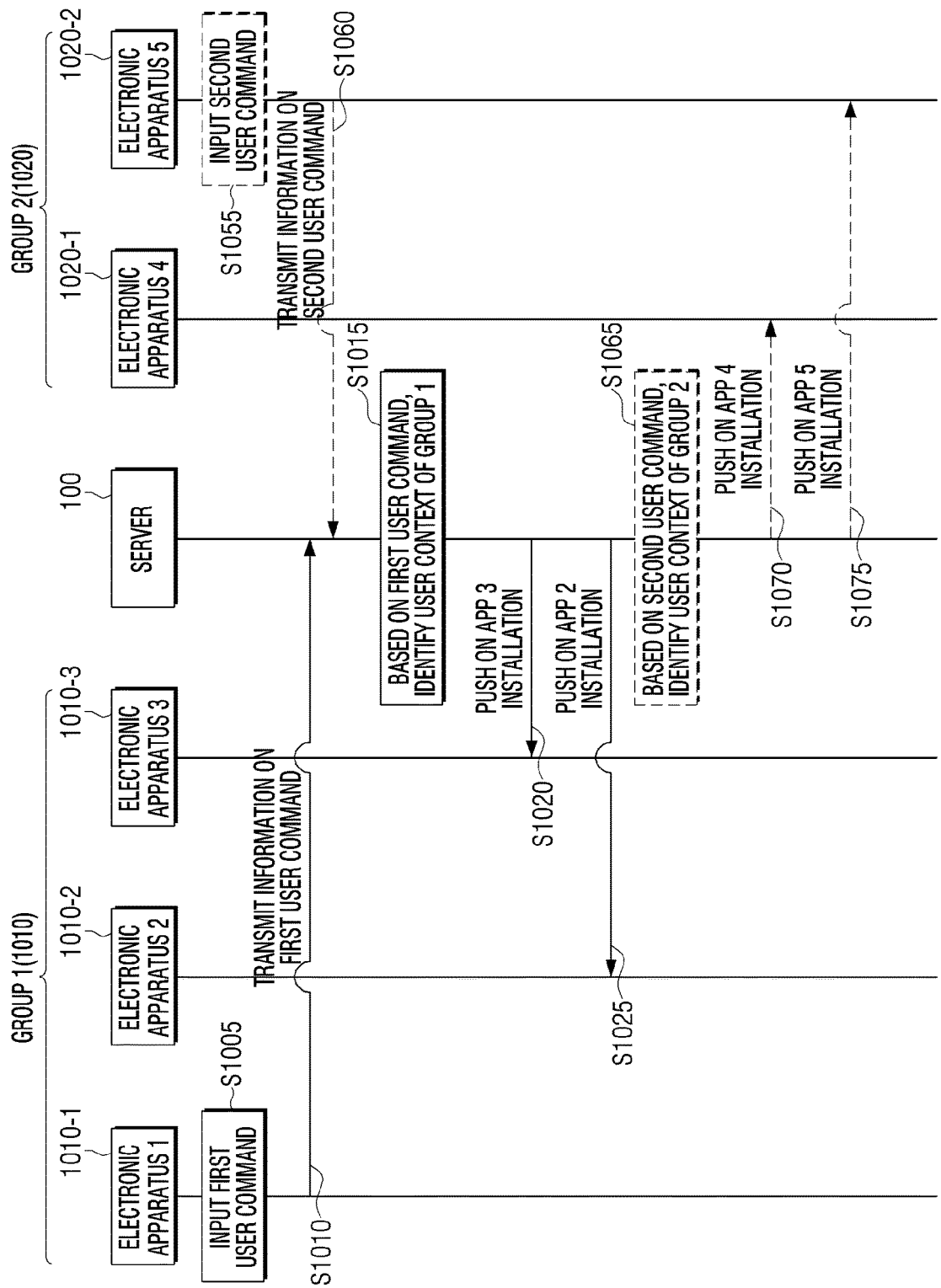
FIG. 10 illustrates a sequence diagram of a server independently identifying context with respect to each of a plurality of groups, and providing an application corresponding to the identified context according to an embodiment of the disclosure.

FIG. 10 illustrates a sequence diagram of a server independently identifying context with respect to each of a plurality of groups, and providing an application corresponding to the identified context according to an embodiment of the disclosure.

In FIG. 10, electronic apparatuses 1 to 3 1010-1, 1010-2 and 1010-3 may belong to group 1 1010 based on being connected to the communicator 110 through a relay device, and electronic apparatus 4 to 5 1020-1 and 1020-2 may belong to group 2 1020 based on being connected to the communicator 110 through another relay device.

Referring to FIG. 10, based on a first user command being input to electronic apparatus 1 1010-2 (S1005), the server 100 may receive information on the first user command from electronic apparatus 1 1010-1 (S1010).

The server 100 may identify the user context of group 1 based on the first user command (S1015). The server 100 may identify the context selected by the first user command as the user context of group 1.

Unlike FIG. 10, based on a specific application being installed in a corresponding electronic apparatus according to the user command input to the at least one electronic apparatus from among the electronic apparatuses belonging to group 1 1010 or a specific function being performed in the corresponding electronic apparatus, the server 100 which received information on the installed application or the information on the performed function may identify the user context of group 1.

Then, the server 100 may perform a push to cause app 2 and app 3 corresponding to the user context of the identified group 1 1010 to be installed in each of electronic apparatus 2 1010-2 and electronic apparatus 3 1010-3 (S1020, S1025). Thereafter, the server 100 may be configured to control electronic apparatuses 1 to 3 1010-1, 1010-2 and 1010-3 to cause the functions corresponding to the user context of identified group 1 1010 to be performed.

Independent from the processes of S1005 to S1025 described above, based on a second user command being input to electronic apparatus 5 1020-2 belonging to group 2 1020 (S1055), the server 100 may receive information of the second user command from electronic apparatus 5 1020-2 (S1060).

The server 100 may, based on the second user command, identify the user context of group 2 1020 (S1065). Then, the server 100 may perform a push to cause app 4 and app 5 corresponding to the user context of the identified group 2 1020 to be installed in electronic apparatus 4 1020-1 and electronic apparatus 5 1020-2, respectively.

The processor 130 may, based on the user command input through the electronic apparatus belong to each group, generate or edit information on at least one context. Then, the processor 130 may provide a service to each group according to the information on the generated or edited context.

The service may be a term comprising a series of processes such as the server 100 identifying the user context of one group, performing a push to cause the plurality of applications corresponding to the identified context to be installed in the electronic apparatuses of each group, and performing a push to cause the plurality of functions corresponding to the identified context to be executed in the electronic apparatuses of each group.

The service may be defined for each context. For example, the server providing a service on context A may, based on the user context of one group from among the plurality of groups being identified as context A, perform a push on the electronic apparatuses of a corresponding group to cause the plurality of applications corresponding to context A to be installed and/or perform a push on the electronic apparatuses of a corresponding group to cause the plurality of functions corresponding to context A to be executed.

Figure 11A:
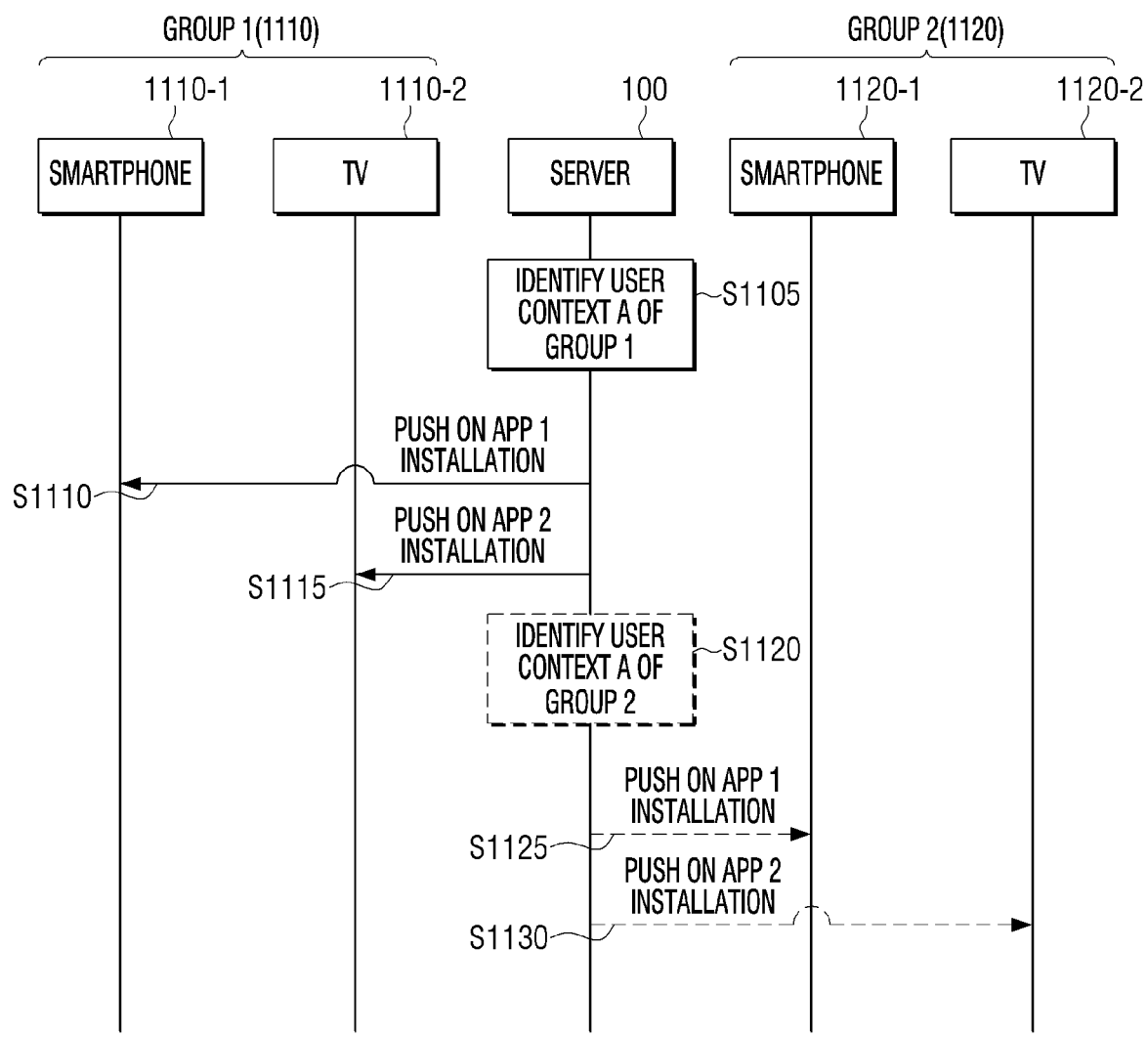
FIG. 11A illustrates a sequence diagram of a server editing information on an application corresponding to a specific context according to a user command received through one group from among a plurality of groups, and with respect to the corresponding group, providing an application according to information edited at the time the corresponding context was generated according to an embodiment of the disclosure.
Figure 11B:
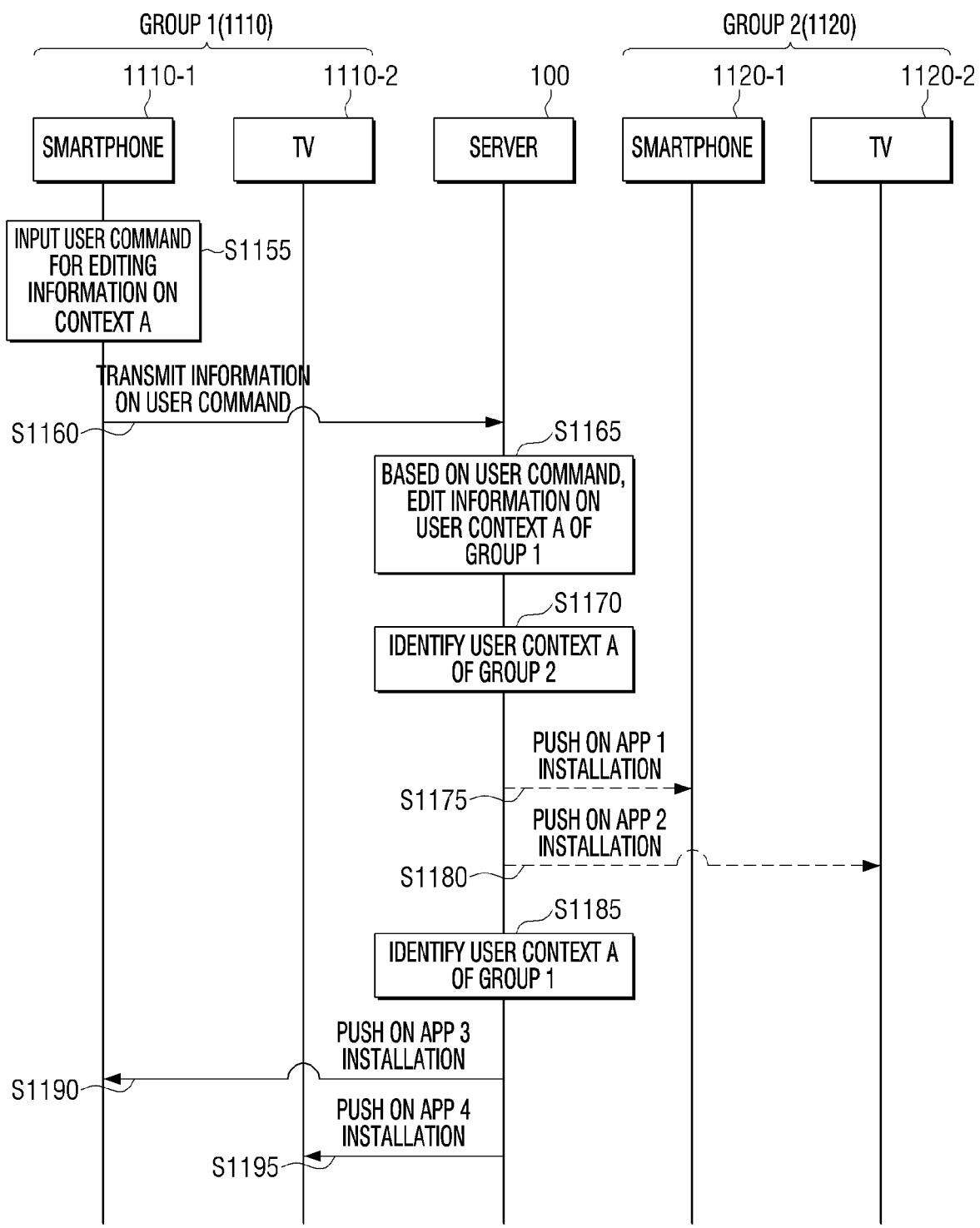
FIG. 11B illustrates a sequence diagram of a server editing information on an application corresponding to a specific context according to a user command received through one group from among a plurality of groups, and with respect to the corresponding group, providing an application according to information edited at the time the corresponding context was generated according to an embodiment of the disclosure.

FIGS. 11A and 11B illustrates sequence diagrams of the server editing information on an application corresponding to the specific context according to the user command received through one group from among the plurality of groups, and with respect to the corresponding group, providing an application according to information edited at the time the corresponding context was generated according to an embodiment of the disclosure.

In FIGS. 11A and 11B, each of group 1 1110 and group 2 1120 may include a smartphone and a TV.

Referring to FIG. 11A, based on the user context of group 1 1110 being identified as context A (S1105), the server 100 may perform a push to cause app 1 to be installed in the smartphone 1110-1 (S1110), and perform a push to cause app 2 to be installed in the TV 1110-2 (S1115).

Likewise, referring to FIG. 11, based on the user context of group 2 1120 being identified as context A (S1120), the server 100 may perform a push to cause app 1 to be installed in the smartphone 1120-1 (S1125), and perform a push to cause app 2 to be installed in the TV 1110-2 (S1130).

As described above, based on the context of group 1 1110 and group 2 1120, in which only the smartphone and the TV are included to be the same with one another, being the same, the service provided to the two groups respectively by the server 100 may also be the same.

However, the processor 130 may, based on the user command for editing information on the plurality of applications corresponding to the first context of the user on one group from the plurality of groups being received from the electronic apparatus belonging to the corresponding group, edit the information on the plurality of applications corresponding to first context based on the received user command.

Referring to FIG. 11B, based on the user command for editing information on context A being input to the smartphone 1110-1 (S1155), the server 100 may receive information on the user command (S1160). Then, the server 100 may, based on the user command, edit information on context A of the user of group 1 1110 (S1165).

The server 100 may edit information on the plurality of applications corresponding to context A of the user stored in the memory 120 according to the user command, and store the edited information in the memory 120 as information on the plurality of applications corresponding to context A of the user of group 1 1110. For example, the server 100 may, based on the user command, delete information on app 1 and app 2 from the information on the plurality of applications corresponding to context A of the user of group 1 1110 and add information on app 3 and app 4 thereto.

In addition, the server 100 may edit information on the plurality of functions corresponding to context A of the user stored in the memory 120, and store the information on the edited function in the memory 120 as information on the plurality of functions corresponding to context A of the user of group 1 1110.

Referring to FIG. 11B, based on the user context of group 2 1120 being identified as context A (S1170), the server 100 may perform a push to cause app 1 and app 2 to be installed in the smartphone 1120-1 and the TV 1120-2 respectively, as in FIG. 11A (S1175, S1180).

However, if the user context of group 1 1110 is identified as context A after information on context A of the user of group 1 1110 is edited (S1185), the operation of FIG. 11A and the server 100 may become varied.

The server 100 may perform a push to cause app 3 and app 4 corresponding to context A to be installed in each of the smartphone 1110-1 and the TV 1110-2 according to information on the edited context A (S1190, S1195).

Based on information on context A being edited, at least one from among the plurality of functions corresponding to context A may be changed or the condition for the plurality of functions to be performed may be changed. In this case, the server 100 may perform a push on the smartphone 1110-1 and the TV 1110-2 to cause functions (functions different from prior to editing) corresponding to context A to be performed according to information on the edited context A.

Figure 12:
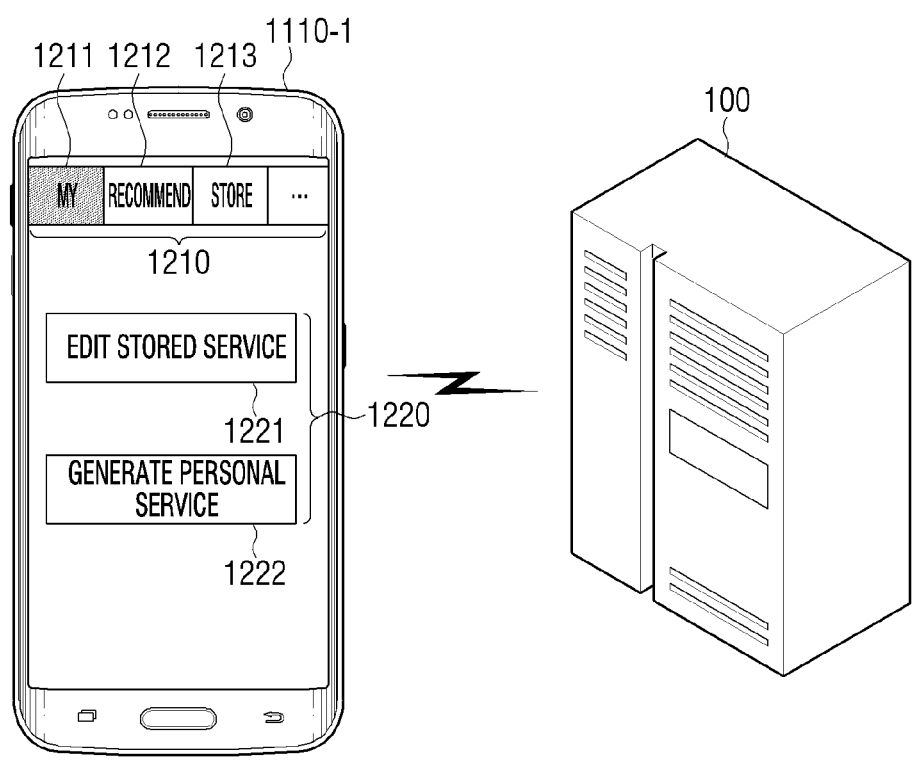
FIG. 12 illustrates a diagram of an electronic apparatus of a user receiving control of a server providing a user interface (UI) for receiving user command to edit information on an application corresponding to a context according to an embodiment of the disclosure.

FIG. 12 illustrates a diagram of an electronic apparatus of the user receiving control of the server providing a user interface (UI) for receiving the user command to edit/generate information on the application/function corresponding to the context according to an embodiment of the disclosure.

FIG. 12, with respect to process S1155 of FIG. 11B, illustrates an example of the smartphone 1110-1 providing a UI to receive input of the user command for editing or generating information on the at least one context.

The smartphone 1110-1 may provide a UI as in FIG. 12 by using information on the UI received from the server 100.

Referring to FIG. 12, the smartphone 1110-1 may provide a menu 1210 including items such as 'MY' 1211, 'recommended' 1212, 'store' 1213, and the like.

Based on the user command selecting the 'store' 1213 item being input, the smartphone 1110-1 may provide information on the context stored in the memory 120 of the server 100 for each context. The smartphone 1110-1 may provide information on the application/function being installed/performed according to each context, that is information on each of the service registered on the server 100.

Based on the user command selecting the 'recommended' 1212 item being input, the smartphone 1110-1 may provide information on services useful to the user according to the configuration of the device included within the group the smartphone 1110-1 belongs from along the servers registered on the server 100.

Specifically, based on the configurations of the electronic apparatuses included in the group to which the smartphone 1110-1 belongs being a smartphone, a TV, and a speaker, the smartphone 1110-1 may provide information on the service for controlling the smartphone, the TV, and the speaker from among the services registered on the server 100. To this end, the server 100 may identify a service suitable for the configuration of the electronic apparatuses within the group to which the smartphone 1110-1 belongs from among the services registered on the server 100, and transmit the information on the identified service to the smartphone 1110-1.

Based on the user command selecting the 'MY' 1211 item being input, the smartphone 1110-1 may provide the menu 1220 including 'edit stored service' 1221 item and 'generate my service' 1222 item, as in FIG. 12.

Based on the user command selecting the 'edit stored service' 1221 item being input, the smartphone 1110-1 may provide a UI for editing at least one from among the services registered on the server 100. When the user command input through the UI is transmitted to the server 100, the server 100 may modify at least one content (e.g., the plurality of applications corresponding to the context, the plurality of functions corresponding to the context, the start event of the context, the end event of the context, etc.) from among the services registered on the server 100 with respect to the group to which the smartphone 1110-1 belongs.

If the user command selecting the 'generate my service' 1222 item is input, the smartphone 1110-1 may provide a UI for generating a new service. Based on the information on the user command input through the UI being received from the smartphone 1110-1, the server 100 may generate a new service comprised of a new context, an application/function provided when the corresponding context is generated, and the start/end event of the corresponding context, and the like.

Based on the user context of the corresponding group being identified as the new context described above according to the start event generated in the group to which the smartphone 1110-1 belongs, the server 100 may push the application/function corresponding to the corresponding context on the electronic apparatuses which belong to the corresponding group.

The service generated by a user of a group may be provided to a user of another group.

Figure 13:
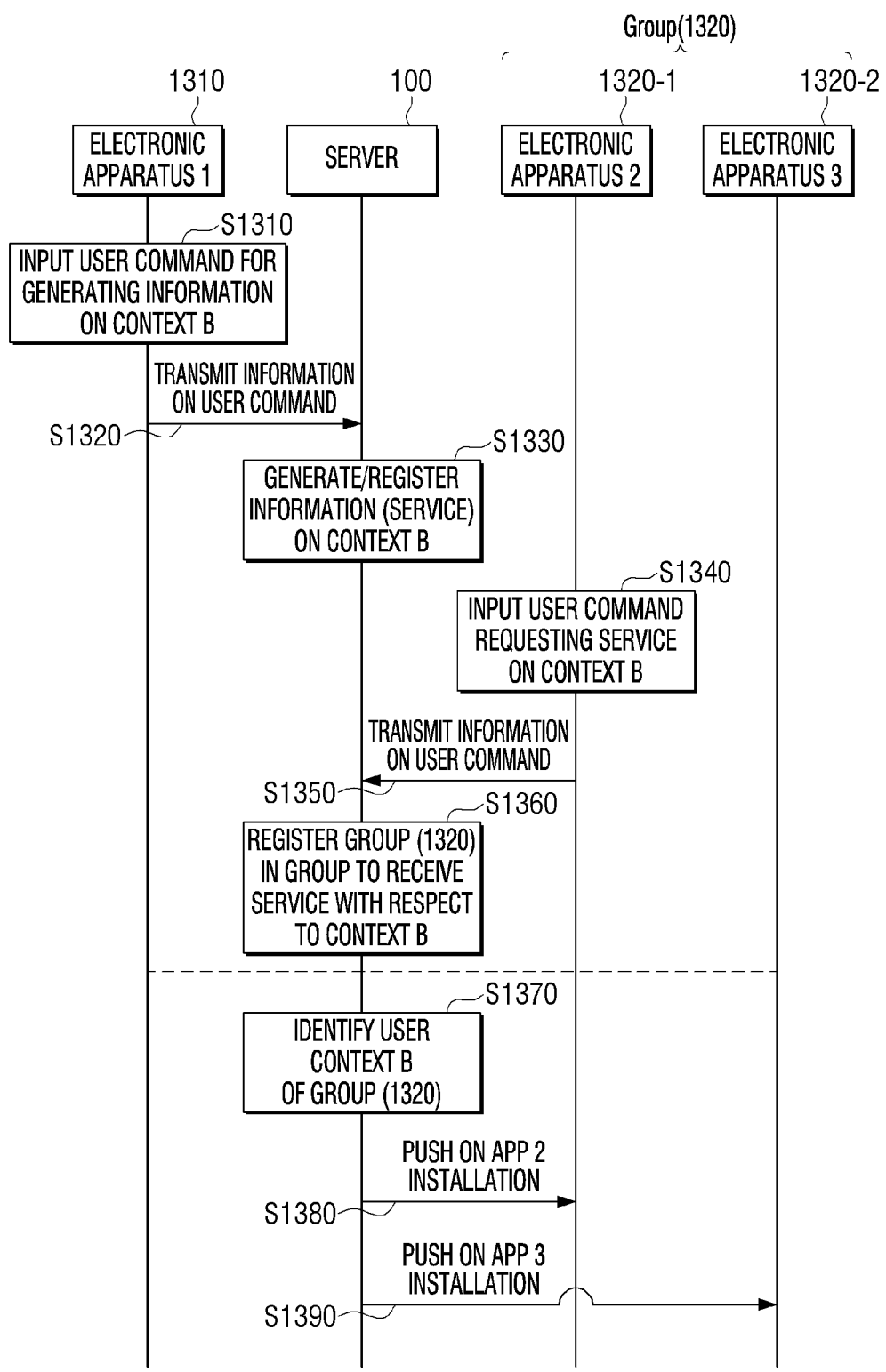
FIG. 13 illustrates a sequence diagram of a server configured to register a service by using information on an application corresponding to a context generated through one group from among a plurality of groups, and providing the registered service to other groups from among the plurality of groups according to an embodiment of the disclosure.

In this respect, FIG. 13 illustrates a sequence diagram of the server configured to register a service by using information on the application corresponding to the context generated through one group from among the plurality of groups, and providing the registered service to other groups from among the plurality of groups according to an embodiment of the disclosure.

The processor 130 may, based on the user command for generating information on the plurality of applications corresponding to the specific context being received from the electronic apparatus belonging to the first group from among the plurality of groups, generate information on the plurality of applications corresponding to the corresponding context based on the received user command.

Referring to FIG. 13, electronic apparatus 1 1310 which belongs to a different group from the group to which electronic apparatus 2 1320-1 and electronic apparatus 3 1320-2 belong may receive input of the user command for generating information on context B (S1310).

In this case, the server 100 may receive information on the user command (S1320), and generate and register information (service) on context B according to the received user command (S1330). Specifically, information on the start/end event of context B, information on the plurality of applications corresponding to context B, information on the plurality of functions corresponding to context B, and the like may be stored in the memory 120.

The processor 130 may, based on the user command being received from the electronic apparatus belonging to the second group from among the plurality of groups, register the second group as the group for receiving the plurality of applications corresponding to the second context generated by the electronic apparatus of the first group.

Referring to FIG. 13, based on the user command requesting a service on context B being input to electronic apparatus 2 1320-1 belonging to the group 1320 (S1340), the server 100 may receive information on the user command requesting the service on context B (S1350), and register the group 1320 in a group for receiving service on context B (S1360).

In this case, the server 100 may register the group 1320 in the group for receiving service on context B only when the user of the group 1320 purchases a service on context B.

Specifically, based on a request by the user on the corresponding service being received from electronic apparatus 2 1320-1, the server 100 may request for the user information required in payment from electronic apparatus 2 1320-1. When user information required for payment is received from electronic apparatus 2 1320-1, the server 100 may register the group 1320 in the group which will receive the service on context B.

Then, based on the user context of the group 1320 being identified as context B (S1370), the server 100 may perform a push to cause app 2 and app 3 from among the plurality of applications corresponding to context B to be installed in each of electronic apparatus 2 1320-1 and electronic apparatus 3 1320-2 (S1380, 1390).

Figure 14:
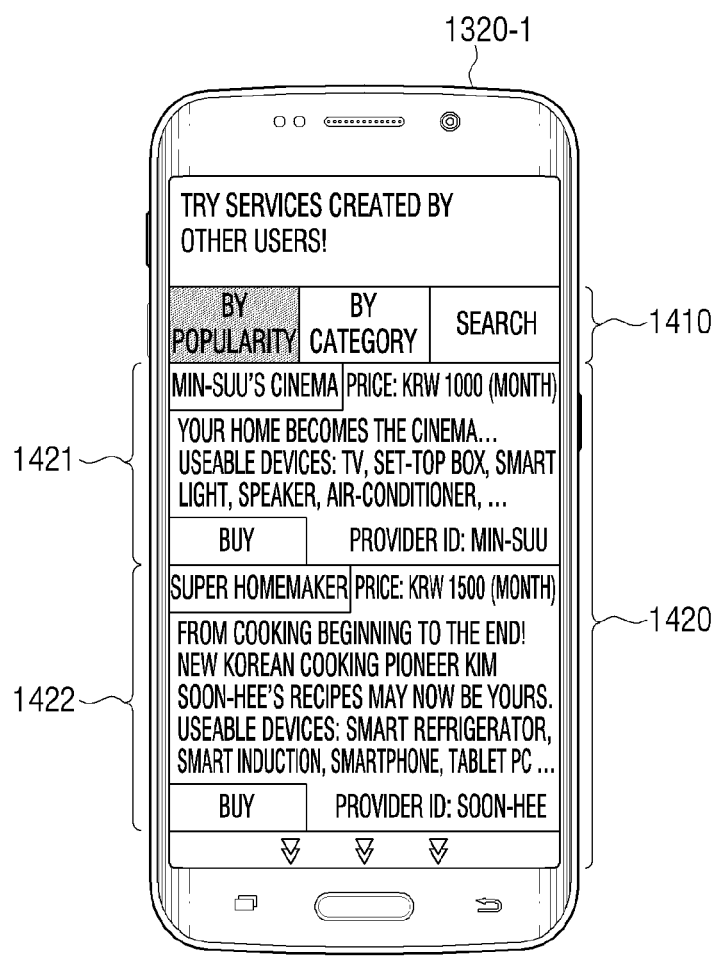
FIG. 14 illustrates a diagram of an electronic device of a user receiving control of a server providing a UI for receiving user command to generate information on an application corresponding to a context.

FIG. 14 illustrates a diagram of the electronic device of the user receiving control of the server providing the UI for receiving the user command to generate information on the application corresponding to the context.

FIG. 14 is an example of a UI provided by the electronic apparatus 1320-1 of FIG. 13 to receive input of the user command requesting at least one service (e.g., service on context B) from among the services registered in the server 100.

Referring to FIG. 14, the electronic apparatus 1320-1 implemented as a smartphone may display a menu 1410 comprising items such as 'by popularity,' by category,' 'search,' and the like.

Based on the user command selecting 'by category' being input, the electronic apparatus 1320-1 may respectively provide items on categories (e.g., housework, play, sports, party, etc.) for classifying the services registered in the server 100. Then, when any one from among the provided items is selected by the user command, the electronic apparatus 1320-1 may provide information on the service of the category of the selected item from among the services registered in the server 100.

Based on the user command selecting 'search' being input, the electronic apparatus 1320-1 may provide a search window for searching at least one from among the services registered in the server 100.

As in FIG. 14, based on the user command selecting the item 'by popularity' being input, the electronic apparatus 1320-1 may provide the service with the most request (purchase) history from users by prioritizing the service from among the services registered in the server 100. The each of the users may be a user of the at least one group from among the plurality of groups in which the plurality of electronic apparatuses connected with the communicator 110 are divided.

Referring to FIG. 14, because the service with the most request (purchase) history from the users from among the registered services is a service designated as 'Min-suu's Cinema,' and the following is a service designated as 'Super Homemaker,' the electronic apparatus 1320-1 may display information on the 'Min-suu's Cinema' service 1421 and information on the 'Super Homemaker' service 1422.

As an example of receiving 'Min-suu's Cinema' service, based on the user inputting a cinema playback command to the set-top box, the server 100 may identify the user context as 'Min-suu's Cinema.' Then, the server 100 may be configured to perform a push to cause the smart light of the user to operate as a cinema lighting, perform a push to cause the air conditioner of the user to operate in a sleep (low sound) mode, and perform a push to cause the speaker of the user to operate in a movie sound mode. Then, when the movie playback has ended, the server 100 may identify the 'Min-suu's Cinema' context of the user as having ended, and control the smart light, the air conditioner, and the speaker to end all functions that were previously pushed.

Referring to FIG. 14, if the user of the group 1320 comprising the electronic apparatus 1320-1 wishes to receive 'Min-suu's Cinema' service, the user may receive 'Min-suu's Cinema' service on the group 1320 by selecting "purchase."

If the user selects "purchase," the electronic device 1320-1 may transmit information on the user command selecting "purchase" and/or information on the electronic apparatuses 1320-1 and 1320-2 comprised in the group 1320 to the server 100. The server 100 may request the user information (e.g., biometric information such as fingerprint, payment password, etc.) required for payment to the electronic apparatus 1320-1, and based on the requested user information being received from the electronic apparatus 1320-1 or another server connected to the electronic apparatus 1320-1 (or, based on the payment authorization information being received from the electronic apparatus 1320-1 or another server), the group 1320 may be additionally registered in the group in which 'Min-suu's Cinema' service is to be received.

Based on the context of the group 1320 being identified as 'Min-suu's Cinema' according to the user command input to at least one from among the electronic apparatuses 1320-1 and 1320-2 comprised in the group 1320, the server 100 may provide 'Min-suu's Cinema' service to the electronic apparatuses 1320-1 and 1320-2 of the group 1320.

At least some from among the profit from selling of 'Min-suu's Cinema' service may be registered as profit of another user (ID: Min-suu) that generated and registered 'Min-suu's Cinema' service.

Accordingly, through the server 100, each of the users using the various electronic apparatuses may be provided with a service generated/edited directly by the user themselves, or a new platform in which the self-generated/edited service is sharable in a paid or free form with other users.

The various embodiments described above through FIGS. 1 to 14 may be slightly modified and/or combined between one another within the technical idea substantially described throughout the disclosure.

In addition to the above-described server 100, a system comprised in the plurality of electronic apparatuses connected with the communicator 110 of the server 100 may also be provided.

Figure 15:
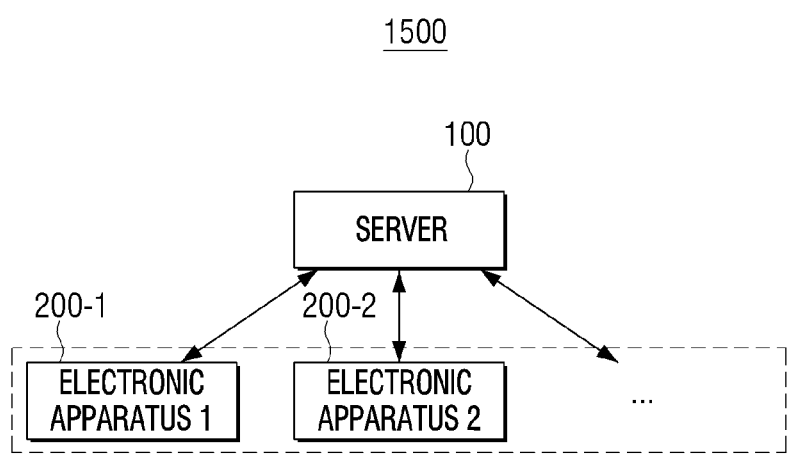
FIG. 15 illustrates a block diagram of a configuration of a system comprising a server and a plurality of electronic apparatuses according to an embodiment of the disclosure.

FIG. 15 illustrates a block diagram of a configuration of a system comprising a server and a plurality of electronic apparatuses according to an embodiment of the disclosure.

Referring to FIG. 15, the system 1500 according to an embodiment may include a server 100 storing information on the plurality of applications for each user context and a plurality of electronic apparatuses 200-1, 200-2, . . . connected with the server. The plurality of electronic apparatuses 200-1, 200-2, . . . may correspond to various user devices capable of connecting with the communicator 110.

Like the embodiment described above, the server 100 of the system 1500 may, based on the first application from among the plurality of applications corresponding to the user context being installed in the first electronic apparatus 200-1 from among the plurality of electronic apparatuses, identify the second electronic apparatus 200-2 to which the second application is to be installed from among the plurality of applications corresponding to the user context, and control the second electronic apparatus 200-2 to cause the second application to be installed in the second electronic apparatus 200-2.

Further, the server 100 of the system 1500 may be configured to, like the embodiment described above, store information on the plurality of groups to which the plurality of electronic apparatuses are divided based on at least one from among the location information of the plurality of electronic apparatuses and the user information of the plurality of electronic apparatuses, identify the user context on the first group based on the user command input to at least one from among the plurality of electronic apparatuses belonging to the first group from among the plurality of groups, and control the plurality of electronic apparatuses belonging to the first group to cause the plurality of applications corresponding to the user context on the identified first group to be installed in at least one from among the plurality of electronic apparatuses belonging to the first group.

Figure 16:
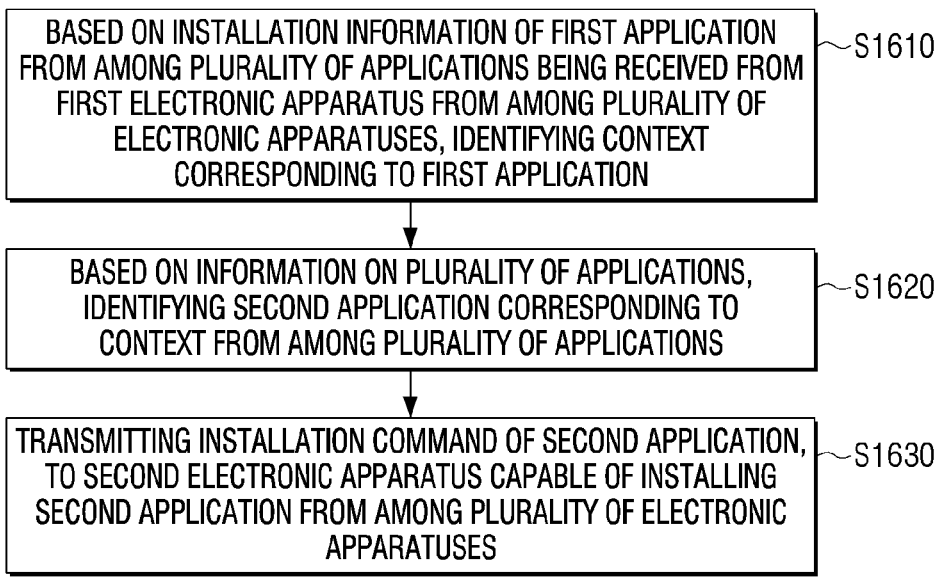
FIG. 16 illustrates a flowchart of a control method of a server according to an embodiment of the disclosure.

FIG. 16 illustrates a flowchart of a control method of the server stored with information on the plurality of applications for each user context according to an embodiment of the disclosure.

Referring to FIG. 16, the control method may, based on an installation information of a first application from among a plurality of applications being received from a first electronic apparatus from among a plurality of electronic apparatuses, identify a context corresponding to the first application (S1610).

The control method may, based on the information on the plurality of applications, identify a second application corresponding to the context from among the plurality of applications (S1620).

In other words, the control method may, based on the first application from among the plurality of applications corresponding to the user context being installed in the first electronic apparatus from among the plurality of electronic apparatuses connected to the server, identify, from among the plurality of electronic apparatuses, the second electronic apparatus to which the second application from among the plurality of applications corresponding to the user context is to be installed.

In this case, based on the first application being installed in the first electronic apparatus based on the user command input to the first electronic apparatus, the user context corresponding to the first application may be identified based on the stored information, and the second application corresponding to the identified context may be identified.

Alternatively, based on receiving information on the user command input to at least one from among the plurality of electronic apparatuses, identifying the user context based on the received information, and controlling the first electronic apparatus to cause the first application from among the plurality of applications corresponding to the identified context to be installed in the first electronic apparatus, the first application may be installed in the first electronic apparatus. In this case, the control method may identify the second application from among the plurality of applications corresponding to the identified context.

Then, the control method may, by using information on the electronic apparatus to which the second application may be installed, identify the second electronic apparatus to which the second application may be installed.

The control method may transmit an installation command of the second application, to a second electronic apparatus capable of installing the second application from among the plurality of electronic apparatuses (S1630). In other words, the control method may control the second electronic apparatus to cause the second application to be installed in the identified second electronic apparatus.

The server may, with respect to each of the plurality of applications, store information on the function corresponding to the identified user context.

The control method may identify the first function of the first application and the second function of the second application corresponding to the identified context based on the stored information, and control the first and second electronic apparatuses to execute the first and second functions through the first and second applications.

The server may store information on the plurality of groups to which the plurality of electronic apparatuses is divided based on at least one from among the location information of the plurality of electronic apparatuses and the user information of the plurality of electronic apparatuses. The control method may identify the user context on the first group based on the user command input to at least one from among the plurality of electronic apparatuses belonging to the first group from among the plurality of groups.

In this case, the plurality of electronic apparatuses belonging to the first group may be controlled to cause the plurality of applications corresponding to the user context on the identified first group to be installed in the at least one from among the plurality of electronic apparatuses belonging to the first group.

Based on receiving information on the plurality of applications corresponding to the first context of the user with respect to the first group from a third electronic apparatus belonging to the first group, the control method may edit/generate information on the plurality of applications corresponding to the first text based on the received user command.

When the user context with respect to the first group is identified as corresponding to the first context based on the user command input to at least one from among the plurality of electronic apparatuses belonging to the first group, the plurality of electronic apparatuses belonging to the first group may be controlled to cause the edited/generated plurality of applications to be installed in at least one from among the plurality of electronic apparatuses belonging to the first group.

When the user command for editing/generating information on the plurality of applications corresponding to the second context is received from the electronic apparatus belonging to the first group, the control method may edit/generate information on the plurality of applications corresponding to the second context based on the received user command.

In this case, when the user command is received from the electronic apparatus belonging to the second group from among the plurality of groups, the second group may be registered as the group for receiving the (edited/generated) plurality of applications corresponding to the second context.

Based on the user context on the second group being identified as corresponding to the second context based on the user command input to at least one from among the plurality of electronic apparatuses belonging to the second group, the plurality of electronic apparatuses belonging to the second group may be controlled to cause the plurality of applications corresponding to the second context to be installed in at least one from among the plurality of electronic apparatuses belonging to the second group.

The above-described control method may be implemented through the server 100 illustrated and described through FIG. 2A. The above-described control method may also be implemented through the server 100 illustrated and described through FIG. 2A and a system including at least one external server.

The server and system according to the above embodiments may, even if a user command on the application installation is not input to each of the electronic apparatuses of the user, have the effect of causing a plurality of applications to be installed in each of the electronic apparatuses of the user according to user context which was identified on its own.

The server and system according to the above embodiments may have an effect of managing the plurality of electronic apparatuses owned by each user as one group, while providing an application/function suitable to each user context for each group.

The server and system according to the above embodiments may have an effect of providing a new platform to edit/generate information on an application/function corresponding to context according to user command, and freely enable selling/purchasing of services included with the edited/generated application/function between users.

The above-described various embodiments may be implemented within a recording medium capable of being read by a computer or a device similar thereto by using a software, a hardware, or a combination of the software and the hardware.

In terms of a hardware implementation, the embodiments described herein may be implemented by using at least one from among application specific integrated circuits (ASICs), digital signal processors (DSPs), digital signal processing devices (DSPDs), programmable logic devices (PLDs), field programmable gate arrays (FPGAs), a processor, a controller, micro-controllers, a microprocessor, and an electrical unit for performing other functions.

In some cases, the embodiments described herein may be implemented by the processor 130 itself. According to a software implementation, embodiments such as the processes and functions described herein may be implemented with separate software modules. Each of the software modules described may perform one or more of the functions and operations described herein.

The computer instructions for performing processing operations of the server 100 according to the various embodiments described above may be stored in a non-transitory computer-readable medium. The computer instructions stored in this non-transitory computer-readable medium may cause a specific device to perform the processing operations of an server 100 according to the various embodiments described above when executed by the processor of a specific device.

The non-transitory computer readable medium refers to a medium that stores data semi-permanently rather than storing data for a very short time, such as a register, a cache, a memory or the like, and is readable by a device. Specifically, the various applications or programs described above may be stored and provided in a non-transitory computer readable medium such as, for example, and without limitation, a compact disc (CD), a digital versatile disc (DVD), a hard disc, a Blu-ray disc, a universal serial bus (USB), a memory card, a read only memory (ROM), and the like.

While the disclosure has been illustrated and described with reference to various embodiments thereof, the disclosure is not limited to the specific embodiments described, and it will be understood by those skilled in the art that various changes in form and details may be made therein without departing from the spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A server, comprising:
a communicator configured to connect to a plurality of electronic apparatuses;
a memory configured to store information on a plurality of applications for each context and additional information on a function, corresponding to the context, with respect to each of the plurality of applications; and
a processor configured to:
based on receiving installation information of a first application from among the plurality of applications from a first electronic apparatus from among the plurality of electronic apparatuses, identify a context corresponding to the first application,
based on the information on the plurality of applications, identify a second application corresponding to the context from among the plurality of applications,
control the communicator to transmit an installation command of the second application, to a second electronic apparatus capable of installing the second application from among the plurality of electronic apparatuses,
receive, from the first electronic apparatus, information on execution of a first function corresponding to the identified context in the first application,
in response to the received information on execution of the first function, identify a time to execute a second function corresponding to the identified context in the second application,
transmit, to the second electronic apparatus a request to execute the second function corresponding to the identified context in the second application at the identified time to execute the second function,
based on the execution of the second function corresponding to the identified context in the first second application, identify a state of the first second electronic apparatus, and
based on identifying that the second function is completed based on the identified state of the first second electronic apparatus, control the communicator to transmit, to a third electronic apparatus, a request to execute third function corresponding to the identified context through a third application so that the third function is executed sequentially after the second function is completed on the second electronic apparatus.

2. The server of claim 1, wherein the processor is further configured to:
based on the first application being installed in the first electronic apparatus and a user command input to the first electronic apparatus, identify the context corresponding to the first application using the stored information on the plurality of applications.

3. The server of claim 1, wherein the processor is further configured to:
based on receiving information on a user command input to at least one of the plurality of electronic apparatuses through the communicator, identify the context, and
control the first electronic apparatus to install the first application of the plurality of applications corresponding to the identified context.

4. The server of claim 3, wherein the processor is further configured to:
identify a function of the second electronic apparatus corresponding to the identified context based on the additional information, and
control the second electronic apparatus to execute the identified function through the second application.

5. The server of claim 4, wherein the processor is further configured to:
identify the first function of the first application and the second function of the second application corresponding to the identified context based on the additional information,
identify a time at which the first function and the second function are to be executed based on the identified context, and
control the first electronic apparatus to execute the first function through the first application and the second electronic apparatus to execute the second function through the second application at the identified time.

6. The server of claim 4, wherein the processor is further configured to:
based on an execution or deletion of the second application with respect to another function, that is different than the second function, and a user command input to the second electronic apparatus, update information on a function of the second application corresponding to the identified context that is stored in the memory based on information on the executed function, and
update information on the plurality of applications corresponding to the identified context stored in the memory based on the updated information on the second application.

7. The server of claim 1, wherein the processor is further configured to:
based on completing the context, control the first electronic apparatus to delete the first application and control the second electronic apparatus to delete the second application.

8. The server of claim 1, wherein:
the memory is further configured to store additional information on a plurality of groups in which the plurality of electronic apparatuses are divided based on at least one of a location information of the plurality of electronic apparatuses and a user information of the plurality of electronic apparatuses, and
the processor is further configured to:
identify a context on a first group of the plurality of groups, and
control electronic apparatuses of the first group to install a plurality of applications corresponding to the context on the first group in at least one of the electronic apparatuses of the first group.

9. The server of claim 8, wherein the processor is further configured to:
based on a user command received from an electronic apparatus of the first group, where the user command is for editing information of a first plurality of applications corresponding to a first context of a user with respect to the first group, edit the information on the first plurality of applications based on the user command, and
based on a context on the first group corresponding to the first context, control a first plurality of electronic apparatuses of the first group to install the first plurality of applications in at least one of the first plurality of electronic apparatuses.

10. The server of claim 8, wherein the processor is further configured to:
based on a user command received from an electronic apparatus of the first group, where the user command is for generating information on a first plurality of applications corresponding to a second context, generate the information on the first plurality of applications based on the user command,
based on another user command that is received from an electronic apparatus of a second group of the plurality of groups, register the second group as a group to which the plurality of applications corresponding to the second context is provided, and
based on a context of the second group that is identified as corresponding to the second context, control a second plurality of electronic apparatuses of the second group to install the plurality of applications corresponding to the second context in at least one of the second plurality of electronic apparatuses.

11. A control method of a server stored with information on a plurality of applications for each context and additional information on a function, corresponding to the context, with respect to each of the plurality of applications, the method comprising:
based on receiving an installation information of a first application from among athe plurality of applications from a first electronic apparatus from among a plurality of electronic apparatuses, identifying a context corresponding to the first application;
based on the information on the plurality of applications, identifying a second application corresponding to the context from among the plurality of applications;
transmitting an installation command of the second application, to a second electronic apparatus capable of installing the second application from among the plurality of electronic apparatuses;
receiving, from the first electronic apparatus, information on execution of a first function corresponding to the identified context in the first application,
in response to the received information on execution of the first function, identifying a time to execute a second function corresponding to the identified context in the second application,
transmitting, to the second electronic apparatus a request to execute the second function corresponding to the identified context in the second application at the identified time to execute the second function,
based on the execution of the second function corresponding to the identified context in the second application, identifying a state of the second electronic apparatus; and
based on identifying that the second function is completed based on the identified state of the second electronic apparatus, transmitting, to a third electronic apparatus, a request to execute a third function corresponding to the identified context through a third application so that the third function is executed sequentially after the second function is completed on the second electronic apparatus.

12. The method of claim 11, further comprising:
based on the first application being installed in the first electronic apparatus and a user command input to the first electronic apparatus, identifying the context corresponding to the first application using the stored information on the plurality of applications.

13. The method of claim 11, further comprising:
receiving information on a user command input to at least one of the plurality of electronic apparatuses;
identifying the context based on the received information; and
controlling the first electronic apparatus to install the first application of the plurality of applications corresponding to the identified context.

14. The method of claim 11, further comprising:
identifying the first function of the first application and the second function of the second application corresponding to the context based on the additional information; and
controlling the first electronic apparatus and the second electronic apparatus to execute the first function and the second function through the first application and the second application.

15. The method of claim 11, further comprising:
storing additional information on a plurality of groups in which the plurality of electronic apparatuses are divided based on at least one of a location information of the plurality of electronic apparatuses and a user information of the plurality of electronic apparatuses;
identifying a context on a first group of the plurality of groups; and
controlling electronic apparatuses of the first group to install a plurality of applications corresponding to a context on the first group in at least one of the electronic apparatuses of the first group.

16. The method of claim 15, further comprising:
based on a user command received from an electronic apparatus of the first group, where the user command is for editing information of a first plurality of applications corresponding to a first context of a user with respect to the first group, editing the information on the first plurality of applications based on the user command; and
based on a context on the first group corresponding to the first context, controlling a first plurality of electronic apparatuses of the first group to install the first plurality of applications in at least one of the first plurality of electronic apparatuses.

17. The method of claim 16, further comprising:
based on a user command that is received from an electronic apparatus of the first group, wherein the user command is for generating information on a first plurality of applications corresponding to a second context, generating the information on the first plurality of applications based on the user command;
based on another user command that is received from an electronic apparatus of a second group of the plurality of groups, registering the second group as a group to which the plurality of applications corresponding to the second context is provided; and
based on a context of the second group that is identified as corresponding to the second context, controlling a second plurality of electronic apparatuses of the second group to install the plurality of applications corresponding to the second context in at least one of the second plurality of electronic apparatuses.

18. A system, comprising:
a server configured to store information on a plurality of applications for each context and additional information on a function, corresponding to the context, with respect to each of the plurality of applications; and
a plurality of electronic apparatuses connected with the server,
wherein the server is configured to:
based on receiving installation information of a first application from among plurality of applications from a first electronic apparatus from among the plurality of electronic apparatuses, identify a context corresponding to the first application,
based on the information on the plurality of applications, identify a second application corresponding to the context from among the plurality of applications,
transmit an installation command of the second application, to a second electronic apparatus capable of installing the second application from among the plurality of electronic apparatuses,
receive, from the first electronic apparatus, information on execution of a first function corresponding to the identified context in the first application,
in response to the received information on execution of the first function, identify a time to execute a second function corresponding to the identified context in the second application,
transmit, to the second electronic apparatus a request to execute the second function corresponding to the identified context in the second application at the identified time to execute the second function,
based on the execution of the second function corresponding to the identified context in the second application, identify a state of the second electronic apparatus, and
based on identifying that the second function is completed based on the state of the second electronic apparatus, transmit, to a third electronic apparatus, a request to execute a third function corresponding to the identified context through a third application so that the third function is executed sequentially after the first second function is completed on the second electronic apparatus.

19. The system of claim 18, wherein the server is configured to:
store additional information on a plurality of groups in which the plurality of electronic apparatuses are divided based on at least one of a location information of the plurality of electronic apparatuses and a user information of the plurality of electronic apparatuses,
identify a context on a first group of the plurality of groups, and
control electronic apparatuses of the first group to install a plurality of applications corresponding to the context on the first group in at least one of the electronic apparatuses of the first group.

* * * * *